United States Patent
Kamimaeda et al.

(10) Patent No.: US 8,676,816 B2
(45) Date of Patent: Mar. 18, 2014

(54) INFORMATION PROCESSING APPARATUS AND METHOD FOR RECOMMENDING CONTENT TO A USER

(75) Inventors: Naoki Kamimaeda, Kanagawa (JP); Tomohiro Tsunoda, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 12/941,630

(22) Filed: Nov. 8, 2010

(65) Prior Publication Data

US 2011/0153598 A1   Jun. 23, 2011

(30) Foreign Application Priority Data

Dec. 22, 2009  (JP) ................ P2009-290902

(51) Int. Cl.
*G06F 7/00* (2006.01)
*G06F 17/30* (2006.01)
*G06F 13/14* (2006.01)

(52) U.S. Cl.
USPC ........................................ 707/749

(58) Field of Classification Search
USPC ......... 707/1/1, 733, 748, 758, 769, 602, 722, 707/749, 767, 795; 705/7.29, 7.33, 14.46, 705/14.45, 14.54; 706/21, 52
See application file for complete search history.

(56) References Cited

U.S. PATENT DOCUMENTS 6,370,513 B1 * 4/2002 Kolawa et al. ............... 705/7.33
2008/0250026 A1 * 10/2008 Linden et al. ................... 707/10

FOREIGN PATENT DOCUMENTS

| JP | 10-243309 | 9/1998 |
| JP | 2002-532023 | 9/2002 |
| JP | 2004-343320 | 12/2004 |
| JP | 2006-302194 | 11/2006 |
| JP | 2008-070958 | 3/2008 |
| JP | 2009-015560 | 1/2009 |
| JP | 2009-294921 | 12/2009 |
| WO | WO 00/33573 | 6/2000 |

* cited by examiner

*Primary Examiner* — Usmaan Saeed
*Assistant Examiner* — Cecile Vo
(74) *Attorney, Agent, or Firm* — Finnegan, Henderson, Farabow, Garrett & Dunner, LLP

(57) ABSTRACT

An information processing apparatus is configured to search for and recommend content by considering both the feature quantities of content and the references of the user. A correction unit corrects item feature quantities of a recommendation target item by using user preferences of a recommendation target user. A matching unit compares the item feature quantities corrected by the correction unit with the item feature quantities of another item and searches for content having item feature quantities that resemble those of the recommendation target item. A recommendation unit recommends related items to the recommendation target user having features resembling those of the recommendation target item.

12 Claims, 27 Drawing Sheets

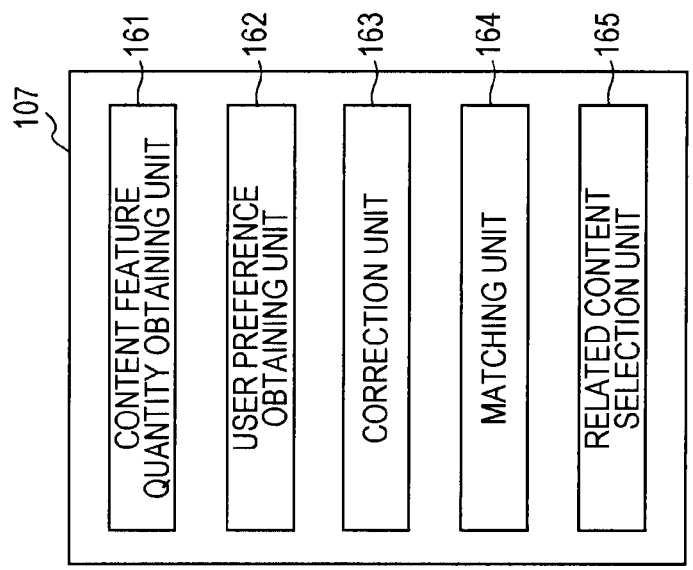
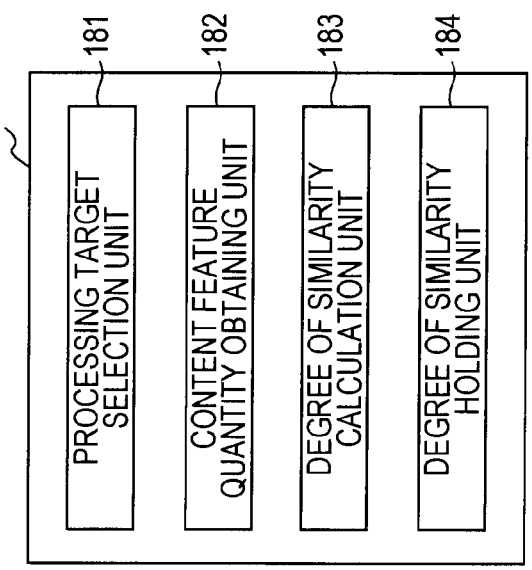
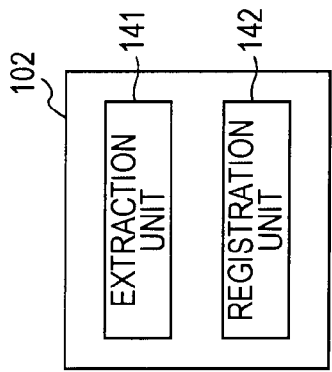
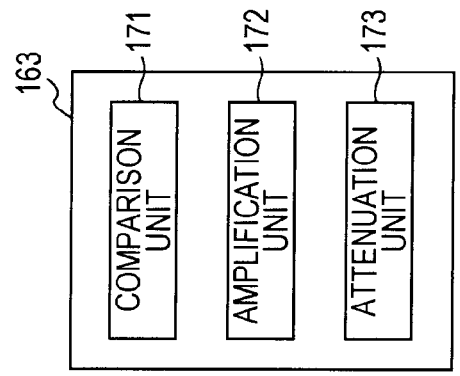

FIG. 3

| ItemID | AttributeID | ValueID | Nof Times | Score |
|---|---|---|---|---|
| 2000114789142 | 1 | 153144 | 1 | 1. 58454294474... |
| 200019580489 | 1 | 153144 | 1 | 1. 58454294474... |
| 1000024316163 | 1 | 153144 | 1 | 1. 58454294474... |
| 200029239012 | 1 | 153144 | 1 | 1. 58454294474... |
| 20003054291 | 1 | 153144 | 1 | 1. 58454294474... |
| 1000015188163 | 1 | 153144 | 1 | 1. 58454294474... |
| 2000156603690 | 1 | 153144 | 1 | 1. 58454294474... |
| 200028798516 | 1 | 153144 | 1 | 1. 58454294474... |
| 200023896754 | 1 | 153144 | 1 | 1. 58454294474... |
| 1000000208159 | 1 | 153144 | 1 | 1. 58454294474... |
| 1000009352163 | 1 | 153144 | 1 | 1. 58454294474... |
| 2000118479140 | 1 | 153144 | 1 | 1. 58454294474... |
| 200028083320 | 1 | 153144 | 1 | 1. 58454294474... |
| 200021717172 | 1 | 153144 | 1 | 1. 58454294474... |
| 1000030179163 | 1 | 153144 | 1 | 1. 58454294474... |
| 200028082520 | 1 | 153144 | 1 | 1. 58454294474... |
| 2000003816163 | 1 | 153144 | 1 | 1. 58454294474... |
| 2000010131161 | 1 | 153144 | 1 | 1. 58454294474... |
| 20001672573 | 1 | 153144 | 1 | 1. 58454294474... |
| 1000000208164 | 1 | 153144 | 1 | 1. 58454294474... |
| 2000115762141 | 1 | 153144 | 1 | 1. 58454294474... |
| 20003054501 | 1 | 153144 | 1 | 1. 58454294474... |
| 1000030781163 | 1 | 153144 | 1 | 1. 58454294474... |
| 20003087081 | 1 | 153144 | 1 | 1. 58454294474... |
| 200029716614 | 1 | 153144 | 1 | 1. 58454294474... |
| 2000138387641 | 1 | 153144 | 1 | 1. 58454294474... |

FIG. 4

| MemberID | AttributeID | ValueID | Score |
|---|---|---|---|
| 1 | 1 | 30 | 0.5 |
| 1 | 2 | 2 | 0.3 |
| 1 | 2 | 4 | 1.3 |
| 1 | 2 | 52 | 4.4 |
| 1 | 2 | 256 | 12.4 |
| 1 | 2 | 34 | 3.4 |
| 1 | 6 | 2 | 0.9 |
| 1 | 6 | 45 | 0.7 |
| 1 | 6 | 6 | 4.1 |
| 1 | 6 | 3 | 2.3 |
| 1 | 11 | 4 | 0.8 |
| 2 | 1 | 63 | 1.2 |
| 2 | 2 | 4 | 0.3 |
| 2 | 2 | 45 | 0.6 |
| 2 | 2 | 65 | 8.7 |
| 2 | 5 | 76 | 3.2 |
| 2 | 6 | 3 | 0.8 |
| 2 | 11 | 53 | 0.9 |
| ⋮ | ⋮ | ⋮ | ⋮ |

192

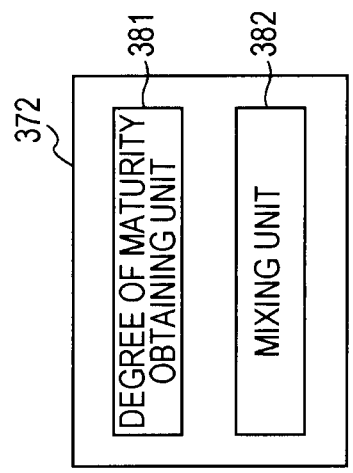
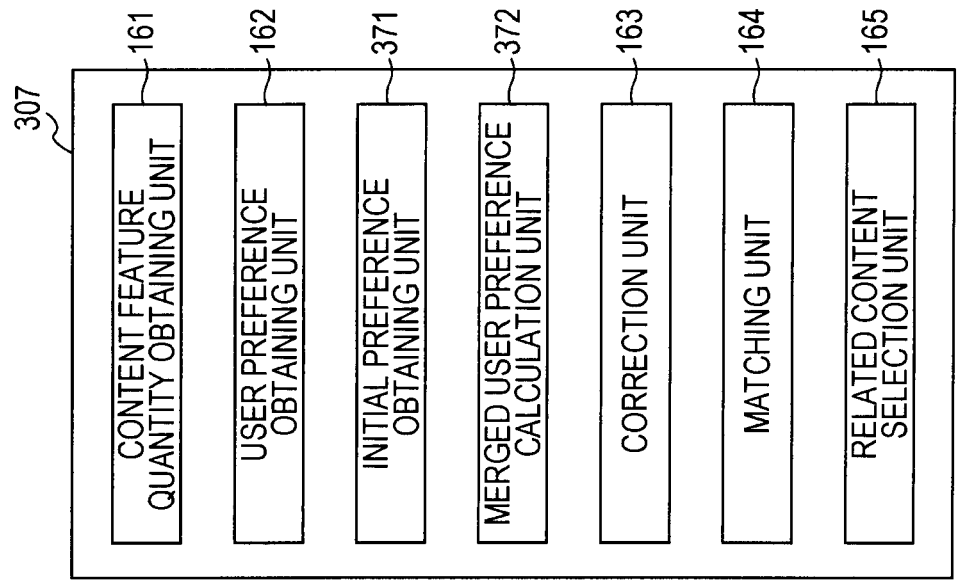
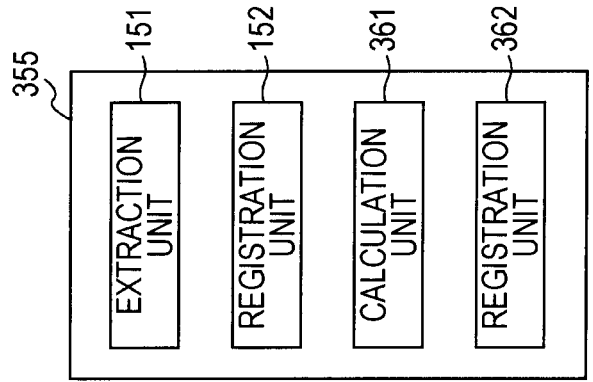

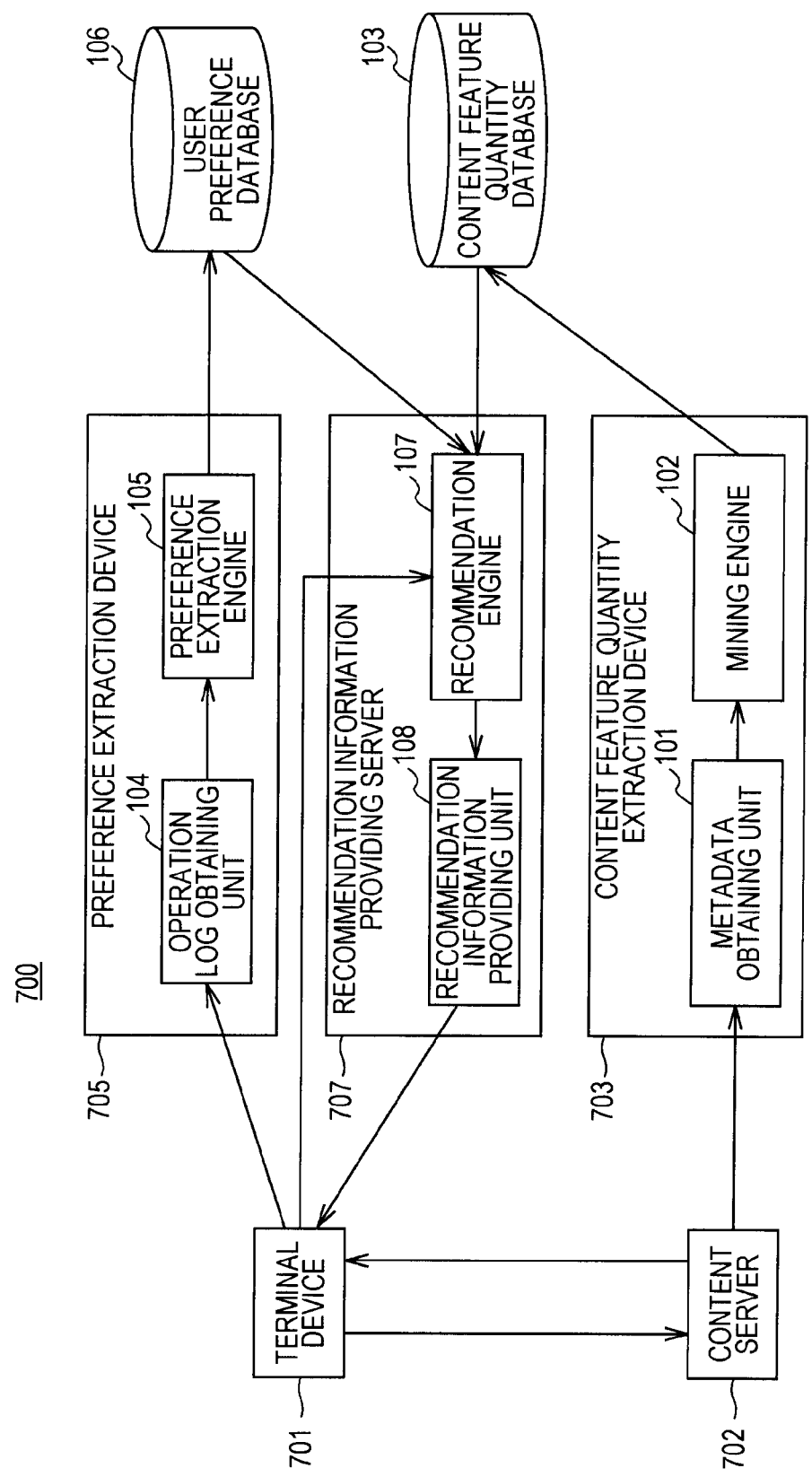

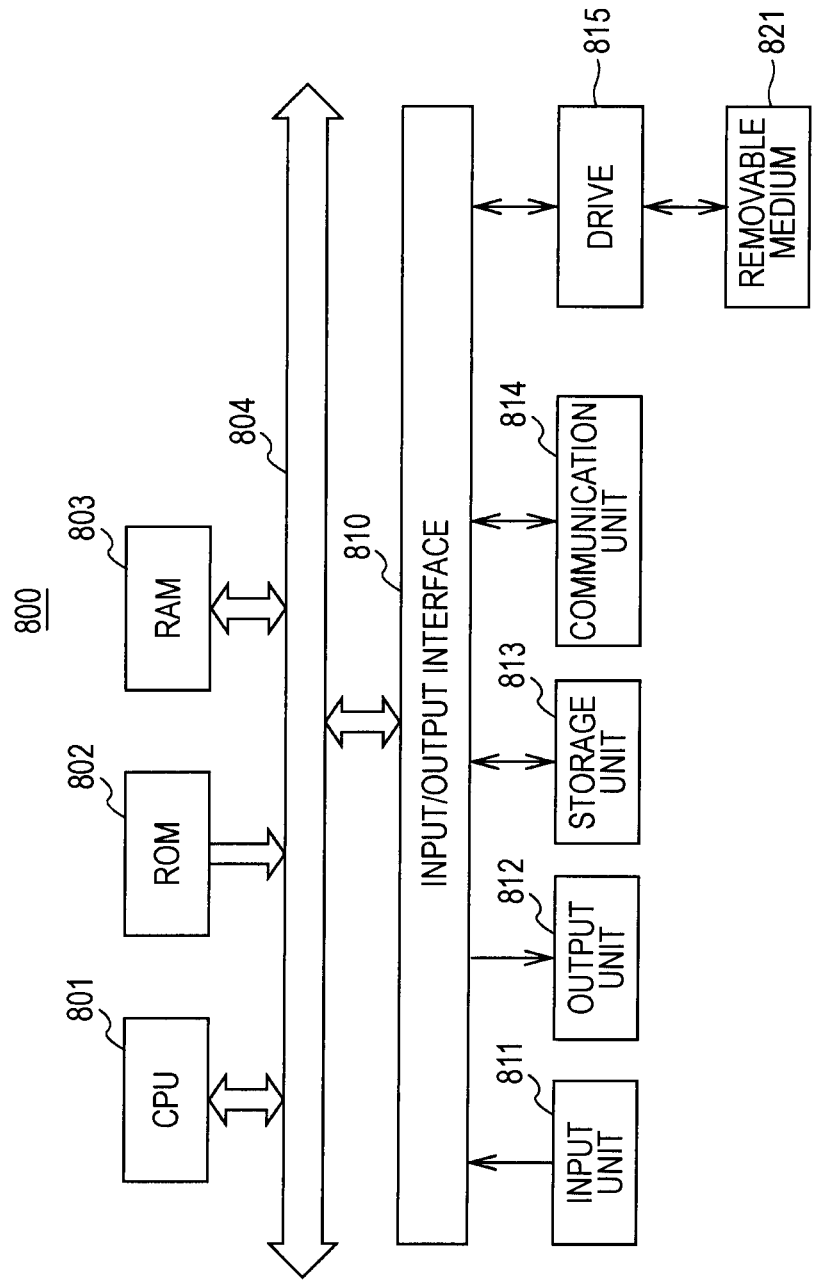

INFORMATION PROCESSING APPARATUS AND METHOD FOR RECOMMENDING CONTENT TO A USER

BACKGROUND OF THE INVENTION

1. Field of the Invention

The present invention relates to an information processing apparatus and method and, more particularly, to an information processing apparatus and method that are capable of more easily recommending content that is more suitable for users.

2. Description of the Related Art

In recent years, technologies for searching for and recommending content related to content that is currently being viewed by a user and content related to content that has already been possessed have been actively researched and developed.

When realizing such technologies, it is common practice that the feature quantities of content are calculated from metadata or the like, and a degree of similarity between the vectors of the content is calculated, and thus, related content is searched for and recommended.

As one of content recommendation methods, a method is considered in which parameters related to the content are provided from a system side to a user, and the user selects parameters used for a search from within a group of parameters, thereby realizing the search of the related content (see, for example, Japanese Unexamined Patent Application Publication (Translation of PCT Application) No. 2002-532023).

SUMMARY OF THE INVENTION

However, in the method disclosed in Japanese Unexamined Patent Application Publication (Translation of PCT Application) No. 2002-532023, although it is possible to search for and recommend content having features resembling those of relevant content as related content, it has not been possible to search for and recommend related content in which features on which the user places importance are emphasized in accordance with the preferences of individual users.

It is desirable to search for and recommend related content by considering both the feature quantities of content and the preferences of a user.

According to an embodiment of the present invention, there is provided an information processing apparatus including: correction means for correcting item feature quantities representing, as an item, features of a recommendation target item for which a recommendation process for recommending an item having features resembling those of the recommendation target item is performed by using user preferences representing preferences of a recommendation target user who is a party to whom the item is recommended with respect to the item; matching means for comparing the item feature quantities corrected by the correction means with the item feature quantities of another item and for searching for another item having item feature quantities that resemble those of the recommendation target item; and recommendation means for recommending related items having features resembling those of the recommendation target item on the basis of the result of the matching by the matching means.

The correction means may further include comparison means for comparing each of attribute values contained in the item feature quantities with each of attribute values contained in the user preferences of the recommendation target user, and amplification means for amplifying a degree of importance of an attribute value contained in both the item feature quantities and the user preferences on the basis of the result of the comparison by the comparison means.

The information processing apparatus may further include attenuation means for attenuating a degree of importance of an attribute value that is contained in the item feature quantities and that is not contained in the user preferences on the basis of the result of the comparison by the comparison means.

The matching means may include degree of similarity calculation means for calculating a degree of similarity between the item feature quantities of the recommendation target item and the item feature quantities of another item, and degree of similarity holding means for holding the degree of similarity calculated by the degree of similarity calculation means.

The degree of similarity calculation means may calculate, as the degree of similarity, a sum total of multiplication results in which a predetermined weight coefficient for each attribute is multiplied by an absolute value of an inner product between attribute vectors in which the item feature quantities are vectorized for each attribute.

The matching means may further include related item selection means for selecting, as related items of the recommendation target item, a predetermined number of the items in ascending order of the value of the degree of similarity held by the degree of similarity holding means.

The information processing apparatus may further include item feature quantity storage means for storing the item feature quantities, wherein the correction means may obtain the item feature quantities of the recommendation target item from the item feature quantity storage means, and may correct the obtained item feature quantities by using the user preferences, and wherein the matching means may obtain the item feature quantities of the other item from the item feature quantity storage means, and may perform matching between the obtained item feature quantities and the item feature quantities corrected by the correction means.

The information processing apparatus may further include metadata obtaining means for obtaining metadata containing information regarding the item; item feature quantity extraction means for extracting the item feature quantities from the metadata obtained by the metadata obtaining means; and item feature quantity registration means for registering the item feature quantities extracted by the item feature quantity extraction means in the item feature quantity storage means.

The information processing apparatus may further include user preference storage means for storing the user preferences, wherein the correction means may obtain the user preferences of the recommendation target user from the user preference storage means, and may correct the item feature quantities of the recommendation target item by using the obtained user preferences.

The information processing apparatus may further include operation log obtaining means for obtaining an operation log of a user; user preference extraction means for extracting the user preferences from the operation log obtained by the operation log obtaining means; and user preference registration means for registering the user preferences extracted by the user preference extraction means in the user preference storage means.

The information processing apparatus may further include preference storage means for storing predetermined preferences, wherein the correction means may obtain the predetermined preferences from the preference storage means, and may correct the item feature quantities of the recommendation target item by using the obtained predetermined preferences.

The information processing apparatus may further include user preference storage means for storing the user preferences, and a degree of maturity indicating the amount of information of the user preferences or a number of times of updating, wherein the correction means may include user preference obtaining means for obtaining the user preferences of the recommendation target user from the user preference storage means, degree of maturity obtaining means for obtaining a degree of maturity of user preferences from the user preference storage means, preference obtaining means for obtaining the predetermined preferences from the preference storage means, mixing means for mixing the predetermined preferences obtained by the preference obtaining means and the user preferences obtained by the user preference obtaining means at a ratio corresponding to the degree of maturity obtained by the degree of maturity obtaining means, comparison means for comparing each of the attribute values contained in the item feature quantities with each of the attribute values contained in the mixed result of the predetermined preferences and the user preferences by the mixing means, and amplification means for amplifying a degree of importance of an attribute value contained in both the item feature quantities and the mixed result on the basis of the result of the comparison by the comparison means.

According to another embodiment of the present invention, there is provided an image processing method for use with an information processing apparatus, including the steps of: correcting, using correction means of the information processing apparatus, item feature quantities representing, as an item, features of a recommendation target item for which a recommendation process for recommending an item having features resembling those of the recommendation target item is performed by using user preferences representing preferences of a recommendation target user who is a party to whom the item is recommended with respect to the item; causing, using matching means of the information processing apparatus, the corrected item feature quantities to be matched with item feature quantities of another item, and searching for another item having the item feature quantities that resemble those of the recommendation target item; and recommending, using recommendation means of the information processing apparatus, related items having features resembling those of the recommendation target item on the basis of the result of the matching.

In an embodiment of the present invention, item feature quantities representing, as an item, the features of a recommendation target item, which is a target for a recommendation process for recommending an item having features resembling those of the recommendation target item, are corrected by using user preferences representing the preferences of a recommendation target user who is a partner to whom an item is recommended with respect to the item. Matching of the corrected item feature quantities with the item feature quantities of another item is performed. Another item having item feature quantities resembling those of the recommendation target item is searched for. On the basis of the matching result, the related items having features that resemble those of the recommendation target item are recommended to the recommendation target user.

According to the embodiment of the present invention, it is possible to recommend content. In particular, by reflecting the preferences of the user, it is possible to recommend content suitable for a user.

BRIEF DESCRIPTION OF THE DRAWINGS

FIGS. 2A, 2B, 2C, 2D, and 2E are block diagrams showing examples of a detailed configuration of each unit;

FIG. 3 shows an example of the structure of a content feature quantity database;

FIG. 4 shows an example of the structure of a user preference database;

FIGS. 16A, 16B, and 16C are block diagrams showing examples of a detailed configuration of each unit of FIG. 13;

FIG. 27 is a block diagram illustrating another example of the configuration of the recommendation system to which the present invention is applied; and FIG. 28 is a block diagram showing an example of the main configuration of a personal computer.

DESCRIPTION OF THE PREFERRED EMBODIMENTS

Embodiments of the present invention will be described below. The description is given in the following order.

1. First Embodiment (recommendation device)
2. Second Embodiment (recommendation device in which initial preferences are provided)
3. Third Embodiment (recommendation device in which initial preferences and user preferences are mixed)
4. Fourth Embodiment (television receiver)
5. Fifth Embodiment (recommendation system)
6. Sixth Embodiment (content distribution system)
7. Seventh Embodiment (recommendation system)
8. Eighth Embodiment (personal computer)

1. First Embodiment

Configuration of Recommendation Device

Figure 1:
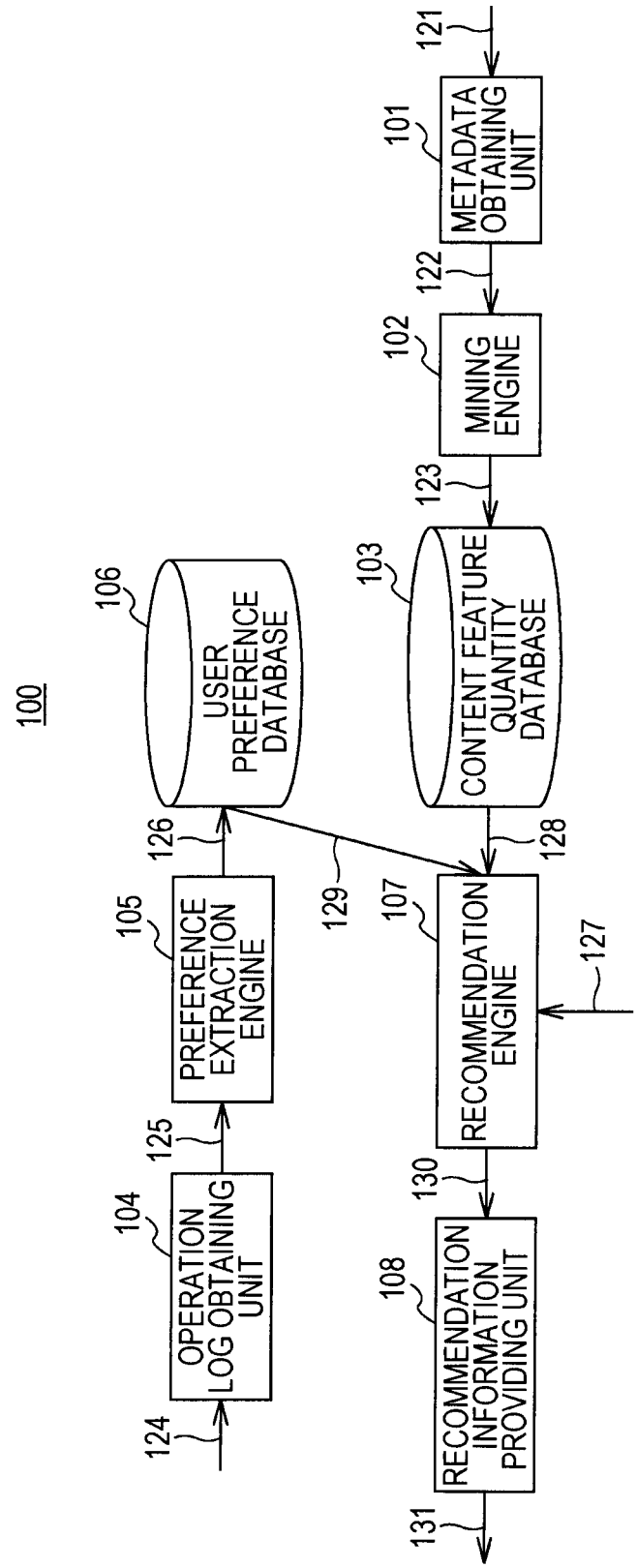
FIG. 1 is a block diagram illustrating an example of the main configuration of a recommendation device to which the present invention is applied.

FIG. 1 is a block diagram showing an example of the main configuration of a recommendation device to which the present invention is applied. A recommendation device 100 shown in FIG. 1 is a device that recommends content, such as, for example, movies. When recommendation target content is specified, the recommendation device 100 searches for, as related content, content having features resembling those of the recommendation target content, and recommends the related content thereof as recommendation content to a user. At this time, the recommendation device 100 causes the preferences of the recommendation target user who is a party (user) to whom the content is recommended to be reflected in the search of the related content.

That is, the recommendation device 100 corrects the content feature quantities of the recommendation target content by considering the preferences of the recommendation target user, and searches for related content having features that resemble the features after the correction. As a result of the above, it is possible for the recommendation device 100 to recommend content that is more suitable for the user, in which the preferences of the user are more reflected.

The recommendation device 100 performs the reflection of the preferences on such content feature quantities in such a manner that the number of parameters of the content feature quantities is not increased. Consequently, it is possible to easily recommend content, in which the preferences of the user are more reflected, which is more suitable for the user.

The recommendation device 100 shown in FIG. 1 includes a metadata obtaining unit 101, a mining engine 102, a content feature quantity database 103, an operation log obtaining unit 104, a preference extraction engine 105, a user preference database 106, a recommendation engine 107, and a recommendation information providing unit 108.

The metadata obtaining unit 101 obtains metadata of content, which serves as candidates for related content (arrow 121). This metadata indicates information on the content to which the metadata corresponds. For example, the information contains the title of the content, the amount of data (reproduction time), performers, a producer, production date and time, place, etc. Of course, any information other than the above may be contained as long as it is information regarding the content.

It is sufficient that the metadata contains information regarding content, and may not be information attached to the content data. For example, the metadata may be data, like an electronic program guide (EPG), which is independent of content that is broadcast.

The metadata obtaining unit 101 obtains such metadata from, for example, any external device, such as a recording device, in which content data has been recorded. The metadata obtaining unit 101 supplies the obtained metadata to the mining engine 102 (arrow 122).

When the mining engine 102 obtains the metadata (arrow 122) supplied from the metadata obtaining unit 101, the mining engine 102 extracts information serving as the features of the content corresponding to the metadata. The mining engine 102 supplies the extracted information as a record to the content feature quantity database 103, whereby the extracted information is registered (arrow 123). That is, the mining engine 102 updates the content feature quantity database 103.

The content feature quantity database 103 is a database for information (content feature quantities) representing the features of the content with regard to the content serving as candidates of related content. The content feature quantity database 103 registers the information supplied from the mining engine 102 as a record, and stores it. The content feature quantity database 103 provides the information that has been stored in that manner as content feature quantities on the basis of the request of the recommendation engine 107 (arrow 128).

The operation log obtaining unit 104 obtains history information on device operations by the user from the outside (arrow 124), and supplies the history information to the preference extraction engine 105 (arrow 125). The operation log is history information on operations regarding the content. The history information may be any operation as long as it is an operation of the user on content. For example, the history information may be a list of metadata of content that is selected by the user as a reproduction target.

The operations of the user on content reflect the preferences of the user with respect to the content. For example, in the case where the user selects certain content and reproduces it, it may be assumed that the user is interested in the content (matches the preferences of the user). That is, a list of the content (or a list of metadata) selected (viewed) by the user is information on content that the user is interested in (matches the preferences of the user). That is, the operation log contains information indicating the preferences of the user with respect to content.

The preference extraction engine 105 extracts information representing the preferences of the user with respect to the content from the operation log supplied from the operation log obtaining unit 104 (arrow 125). That is, for example, the preference extraction engine 105 extracts, from the operation log, the information representing the features of the content that the user is interested in, and the degree of interest.

The preference extraction engine 105 supplies, as user preferences, the item that the user is interested in, and the value indicating the degree of the interest of the user with respect to the item, which is extracted from the operation log, to the user preference database 106 (arrow 126), whereby the item is registered.

The preference extraction engine 105 may correct the value indicating the degree of interest by the user by using a predetermined weight coefficient for the item.

For example, the preference extraction engine 105 multiplies an item for which the preferences of the user are important by a weight coefficient of such a value as to increase the degree of interest of the user. Furthermore, for example, the preference extraction engine 105 multiplies an item whose features possessed by the content are important by a weight coefficient of such a value as to decrease the degree of interest of the user.

As a result of the above, the degree of the user preferences can be controlled for each item when the preferences of the user are reflected in the feature quantities of the content. Consequently, it is possible for the recommendation engine 107 to more appropriately reflect the preferences of the user in the recommendation of the content.

The user preference database 106 is a database of user preferences. The user preference database 106 registers information supplied from the preference extraction engine 105 (arrow 126) as a record, and stores it. The user preference database 106 provides the information that has been stored in that manner as user preferences on the basis of the request of the recommendation engine 107 (arrow 129).

When the recommendation engine 107 receives the information representing the feature quantities of the recommendation target content that is content serving as a reference for recommendation from the outside, the recommendation engine 107 searches for related content of the recommendation target content by using the information of the content feature quantity database 103. That is, the recommendation engine 107 searches for content having feature quantities that resemble the feature quantities of the recommendation target content.

Furthermore, the recommendation engine 107 obtains user preferences of the recommendation target user from the user preference database 106 (arrow 129). The recommendation engine 107 corrects the feature quantities of the recommendation target content by using the user preferences of the recommendation target user. That is, the recommendation engine 107 searches for content having feature quantities that resemble the feature quantities after the recommendation target content is corrected.

The recommendation engine 107 supplies information regarding related content searched for in the manner described above as recommendation content to the recommendation information providing unit 108 (arrow 130).

The recommendation information providing unit 108 organizes the information of the recommendation content, which is supplied from the recommendation engine 107, and supplies the information, as recommendation information, to the user (arrow 131).

FIGS. 2A to 2E are block diagrams illustrating examples of a detailed configuration of each unit of the recommendation device 100 shown in FIG. 1.

As shown in FIG. 2A, the mining engine 102 includes an extraction unit 141 and a registration unit 142. The extraction unit 141 extracts information representing the features of the content from the metadata. The registration unit 142 supplies the information representing the features of the content, which is extracted by the extraction unit 141, as content feature quantities, to the content feature quantity database 103, whereby the content feature quantities are registered.

FIG. 3 shows an example of the structure of a content feature quantity database.

As shown in FIG. 3, content feature quantities 191 registered in the content feature quantity database are formed of items of an item ID (ItemID), an attribute ID (AttributeID), an attribute value ID (ValueID), a number of times of updating (NofTimes), and a degree of importance (Score).

The item ID is identification information for identifying a recommendation matter (item). The recommendation matter is a matter that is recommended, and represents, for example, content. In that case, the item ID is identification information for identifying each content.

The recommendation matter (item) may be of any type. For example, data units, such as a program (entire series or episode), a scene, or a frame image, are arbitrary. Furthermore, for example, the type of data, such as video, audio, or a still image, is arbitrary. Furthermore, for example, the type of content, such as a movie, music, a photograph, news, a web (site), or an advertisement, is arbitrary.

The recommendation target item is an item serving as a reference for recommendation, and is an item that is specified by a user or using a device operated by a user. For example, items on which processing, such as selection, reproduction, video recording, or editing, has been performed are used as recommendation target items. The recommendation process is performed in response to the reception of the specification of the recommendation target item, and performs recommendation of related items related to this recommendation target item. The recommendation item represents a related item of the recommendation target item recommended by the recommendation process.

In the case where the item is content, the recommendation target item is also referred to as "recommendation target content", a related item is also referred to as "related content", and a recommendation item is also referred to as "recommendation content". In the following, a description will be given assuming that, basically, the term "content" is equivalent to the term "item".

The attribute ID is identification information for identifying the attributes of the features of the recommendation matter. The attributes represent the classified features of the recommendation matter for each of the attributes thereof. These attributes are determined in advance. That is, in general, a plurality of indexes representing features of a recommendation matter exist. The indexes are classified into one of a plurality of attributes that are prepared in advance on the basis of the attributes.

Examples of attributes include items, such as a genre, a broadcast station, broadcast day, day of the week, a broadcast time zone, a time frame (the time of the week, etc.), delivery/distribution day, a delivery/distribution source, performers, staff (director, etc.), the original author, cooperation, provision, fees, main targeted persons (sex, age, etc.), or keywords. Of course, any items may be used as long as these indicate the classification of the indexes that represent the features of the recommendation matter.

The attribute value ID is identification information for identifying an attribute value that is an index representing the features of a recommendation matter. The attribute value is classified into one of attributes. Examples of attribute values of a genre include action, comedy, melodrama, sports, news, variety, non-fiction, or song programs. Furthermore, for example, if the attribute is "broadcast day", the date and time at which a broadcast is made is an attribute value. Furthermore, for example, if the attribute is a "performer", the person's name is an attribute value.

The attribute value is information stored at a position that is determined in advance of metadata. That is, the place where the attribute value is extracted in the metadata is determined in advance for each attribute. Therefore, in the case where the attribute value of a certain attribute is to be obtained, the extraction unit 141 extracts the information at the place associated with the attribute of the metadata. The extracted value is set as the attribute value.

For example, the extraction unit 141 extracts the attribute value of the attribute "genre" from the column with regard to the genre of the content of the metadata. When this value is, for example, "action", this "action" is registered as one of attribute values of the attribute "genre" in the content feature quantity database 103. In practice, as shown in FIG. 3, in the record, the attribute values are managed on the basis of the attribute value ID.

This attribute value may be the information itself extracted from the metadata, and may also be information derived from the extracted information. For example, the person's name extracted from the metadata may be used as the attribute value, and the office to which the person belongs may be used as the attribute value. Furthermore, words and phrases that are extracted by performing, for example, morphological analysis of the whole or part of the metadata may be used as the attribute value. For example, in the case of the attribute "keyword", words and phrases extracted from a content introduction sentence contained in the metadata or the like may be used as the attribute value by performing, for example, morphological analysis.

The number of times updating has been performed indicates the number of times in which the record has been updated. The degree of importance indicates the degree of importance of each attribute value. The greater the value, the more important the attribute value is. That is, the combination of each attribute value and the degree of importance of each attribute value are the feature quantities representing the features of the content.

Strictly speaking, information representing features as an item is referred to as "item feature quantity". Here, the term "item" is assumed to be equivalent to the term "content" and is also referred to as "content feature quantity".

Referring back to FIG. 2B, the preference extraction engine 105 includes an extraction unit 151 and a registration unit 152. The extraction unit 151 extracts user preferences, which is information representing the preferences of the user with respect to content (item), from the operation log of the user. The registration unit 152 supplies the user preferences extracted by the extraction unit 151 to the user preference database 106, whereby the user preferences are registered.

FIG. 4 shows an example of the structure of a user preference database.

As shown in FIG. 4, user preferences 192 registered in the user preference database are made up of items of a user ID (memberID), an attribute ID (AttributeID), an attribute value ID (ValueID), and a degree of preference (Score).

The user ID is identification information for identifying a recommendation target user. The attribute ID and the attribute value are identical to those in the case of the content feature quantities 191 (FIG. 3).

The degree of preference indicates the degree of preference of the user with respect to an attribute value. The greater the value, the greater the magnitude of the interest the user has with respect to the attribute value. That is, the combination of each attribute value and the degree of preference with respect to each attribute value is information (user preferences) indicating the preferences of the user.

Referring back to FIG. 2C, the recommendation engine 107 includes a content feature quantity obtaining unit 161, a user preference obtaining unit 162, a correction unit 163, a matching unit 164, and a related content selection unit 165.

The content feature quantity obtaining unit 161 obtains the content feature quantities of specified recommendation target content from the content feature quantity database 103. In response to the request of the content feature quantity obtaining unit 161, the content feature quantity database 103 searches for the record of the recommendation target content, and supplies the search result (searched record) as the content feature quantities to the content feature quantity obtaining unit 161.

That is, the content feature quantity obtaining unit 161 obtains the attribute value possessed by the recommendation target content and the degree of importance thereof.

The user preference obtaining unit 162 obtains the user preferences of the recommendation target user, which is the providing destination of the recommendation information, from the user preference database 106. In response to the request of the user preference obtaining unit 162, the user preference database 106 searches for the record of the recommendation target user, and supplies the search result (the searched record) as the user preferences to the user preference obtaining unit 162.

That is, the user preference obtaining unit 162 obtains the attribute value corresponding to the recommendation target user and the degree of preference thereof.

By using the user preferences of the recommendation target user, which are obtained by the user preference obtaining unit 162, the correction unit 163 corrects the content feature quantities of the recommendation target content obtained by the content feature quantity obtaining unit 161.

Content feature quantities, which are represented as a vector, are referred to as a content vector. A content vector is a vector that is a combination of vectors (attribute vectors) for each attribute. The attribute value is a component (coordinate axis) forming an attribute vector, and the degree of importance of each attribute value indicates the magnitude of each attribute value component. That is, the combination of attribute value components is referred to as an attribute vector.

Similarly, user preferences, which are represented as a vector, are referred to as a user preference vector. The user preference vector is a vector that is a combination of attribute vectors. The degree of preference of each attribute value indicates the magnitude of each attribute value component.

Figure 5:
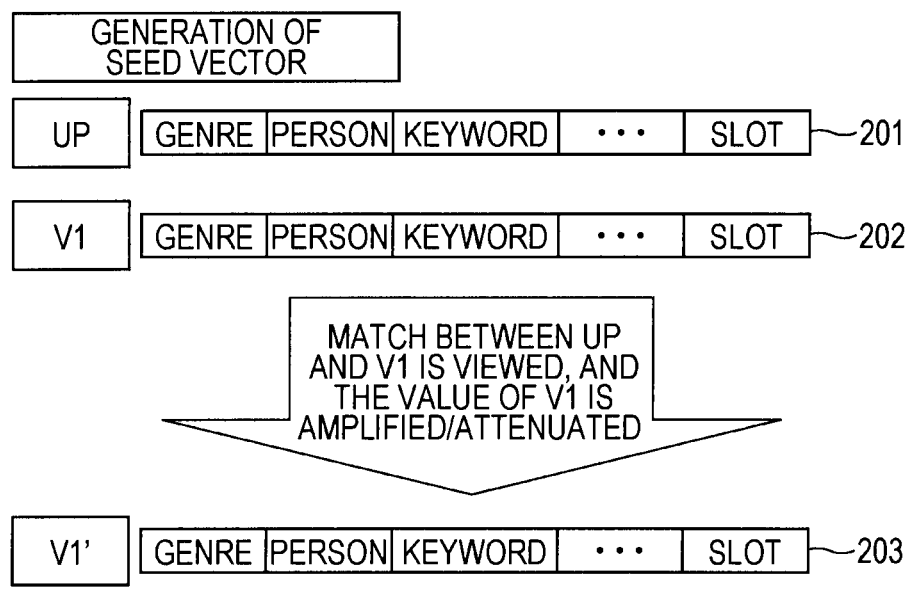
FIG. 5 illustrates an example of a state in which a seed vector is generated.

FIG. 5 illustrates an example of the state of the generation of a seed vector.

As shown in FIG. 5, the correction unit 163 compares the attribute value of each attribute vector of a content vector 202 (V1) with the attribute value of each attribute vector of a user preference vector 201 (UP), and increases or decreases the degree of importance in accordance with the comparison result, thereby generating a seed vector 203 (V1') in which the content vector 202 is corrected.

Referring back to FIG. 2C, the matching unit 164 performs matching between the result of the correction performed by the correction unit 163 and the content feature quantities of the other content. That is, the matching unit 164 compares the seed vector generated in the correction unit 163 with the content vector of each content stored in the content feature quantity database 103, and calculates the degree of similarity thereof. The method of calculating this degree of similarity is arbitrary.

On the basis of the degree of similarity calculated by the matching unit 164, the related content selection unit 165 selects content that has relevance to the recommendation target content and that matches the user preferences as the related content of the recommendation target content.

As shown in FIG. 2D, the correction unit 163 includes a comparison unit 171, an amplification unit 172, and an attenuation unit 173.

The comparison unit 171 compares, for each attribute, the attribute values between the content feature quantities and the user preferences. On the basis of the comparison result, the amplification unit 172 amplifies the degree of importance (the degree of importance contained in the content feature quantities) of the attribute value contained in both the content feature quantities and the user preferences. On the basis of the comparison result, the attenuation unit 173 attenuates the degree of importance of the attribute value that is contained in only the content feature quantities (the attribute value that is not contained in the user preferences).

Figure 6:
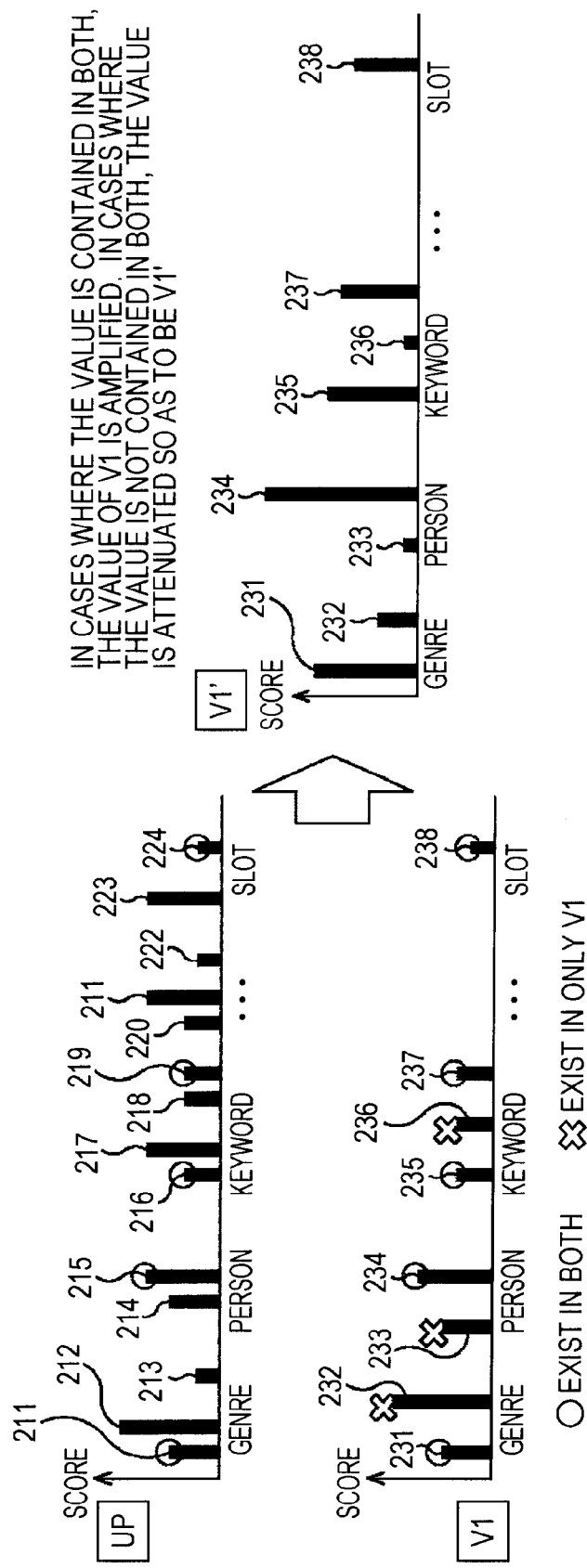
FIG. 6 illustrates an example of a state in which a seed vector is generated.

FIG. 6 illustrates an example of a state in which a seed vector is generated.

Bar graphs 211 to 224 each represent the attribute value of a user preference vector (UP) and the degree of preference thereof. Furthermore, bar graphs 231 to 238 each represent the attribute value of a content vector (V1) and the degree of importance thereof.

Each attribute value is compared for each genre by the comparison unit 171. Regarding the attribute value contained in both the user preference vector and the content vector, the degree of importance thereof is amplified by the amplification unit 172, and regarding the attribute value that exists in only the content vector, the degree of importance thereof is attenuated by the attenuation unit 173.

In FIG. 6, the bar graphs indicated by the circle (○) indicate attribute values that exist in both the content vector and the user preference vector. The bar graphs indicated by the cross (x) indicate the attribute values that exist in only the content vector.

That is, in the case of the example of FIG. 6, the degrees of importance of the attribute values indicated using the bar graph 231, the bar graph 234, the bar graph 235, the bar graph 237, and the bar graph 238 are amplified, and the degrees of importance of the attribute values indicated using the bar graph 232, the bar graph 233, and the bar graph 236 are attenuated.

In the manner described above, as shown on the right side of FIG. 6, a seed vector (V1') after correction is generated.

Specific techniques of amplification and attenuation are arbitrary. For example, the amplification may be set by increasing the degree of importance by N (N>1) times and the attenuation may be set by increasing the degree of importance by 1/N times. Furthermore, the width (ratio) of the amplification and the attenuation corresponding to the value of the degree of preference of the user preferences may be determined. Furthermore, only the amplification may be performed, and the attenuation may not be performed. The width (ratio) of the amplification and the attenuation can be set independently of each other.

Referring back to FIG. 2E, the matching unit 164 includes a processing target selection unit 181, a content feature quantity obtaining unit 182, a degree of similarity calculation unit 183, and a degree of similarity holding unit 184.

The processing target selection unit 181 selects other content for which matching is performed from within the content registered in the content feature quantity database 103. The content feature quantity obtaining unit 182 obtains the content feature quantities of the content selected by the processing target selection unit 181 from the content feature quantity database 103.

The degree of similarity calculation unit 183 calculates the degree of similarity between the content feature quantities (seed vector) of the recommendation target content corrected by the correction unit 163 and the content feature quantities (content vector) obtained by the content feature quantity obtaining unit 182.

Figure 7:
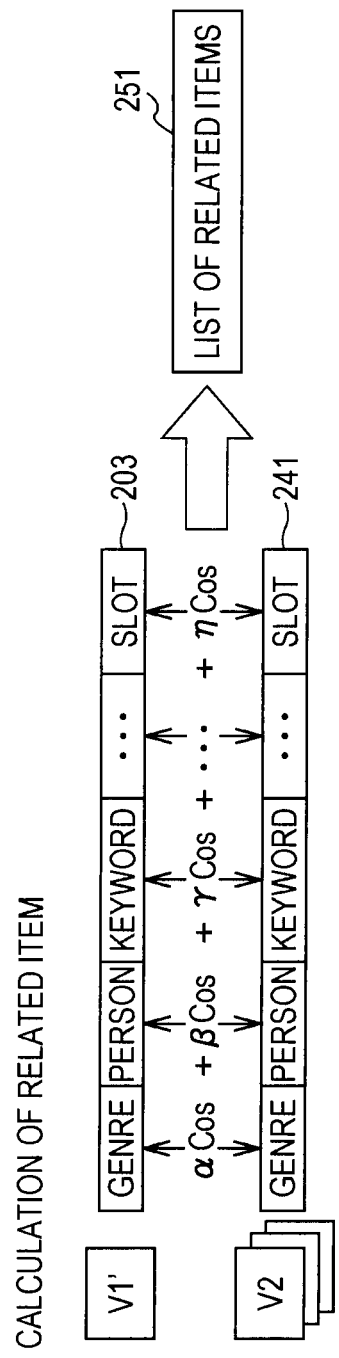
FIG. 7 illustrates an example of a state of matching.

FIG. 7 illustrates an example of the state of a matching.

As shown in FIG. 7, the degree of similarity calculation unit 183 calculates the inner product of the attribute vectors having the same attribute or a cosine, between a seed vector 203 (V1') and a content vector 241 (V2) of the other content. Furthermore, the degree of similarity calculation unit 183 multiplies the absolute value of the calculation result of each attribute by the weight pre-assigned to each attribute. Then, the degree of similarity calculation unit 183 adds the sum total of those multiplication results as the degree of similarity between the seed vector 203 and the content vector 241 of the other content to the list 251 of the related items.

A more specific example of a degree of similarity computation will be described. For example, the attribute contained in the set A of attributes possessed by the recommendation target item is denoted as a, and the weight of the attribute a is denoted as Wa. Furthermore, the attribute vector of the attribute a of the recommendation target item is denoted as Xa, and the attribute vector of the attribute a of the other item for which the degree of similarity is to be calculated is denoted as Ya. The degree of similarity calculation unit 183 calculates the degree of similarity sim(X, Y) between the recommendation target item and the other item, as in, for example, Expression (1) below.

$$sim(X, Y) = \sum_{a \in A} (|X_a \cdot Y_a| \times w_a) \quad (1)$$

This degree of similarity is arbitrary, and may be an inner product of attribute vectors, a cosine scale, or an Euclidean distance. Of course, computation results other than the above may be used.

Referring back to FIG. 2E, the degree of similarity holding unit 184 holds the degree of similarity calculated by the degree of similarity calculation unit. Of course, this degree of similarity is associated with the other content for which a degree of similarity is calculated.

As described above, the degree of similarity calculated in this manner is used to select related content by the related content selection unit 165. That is, for example, the related content selection unit 165 sorts a list of the other content in the ascending order of the degree of similarity, selects a predetermined number of the other higher order content as related content, and supplies the list to the recommendation information providing unit 108. The related content selection unit 165 may perform only the sort on the basis of the degree of similarity of the list of the other content and supply the list of all the other content to the recommendation information providing unit 108.

Flow Of Processing

Next, a description will be given of the flow of various processes performed by the recommendation device 100 in order to perform content recommendation as described above.

Figure 8:
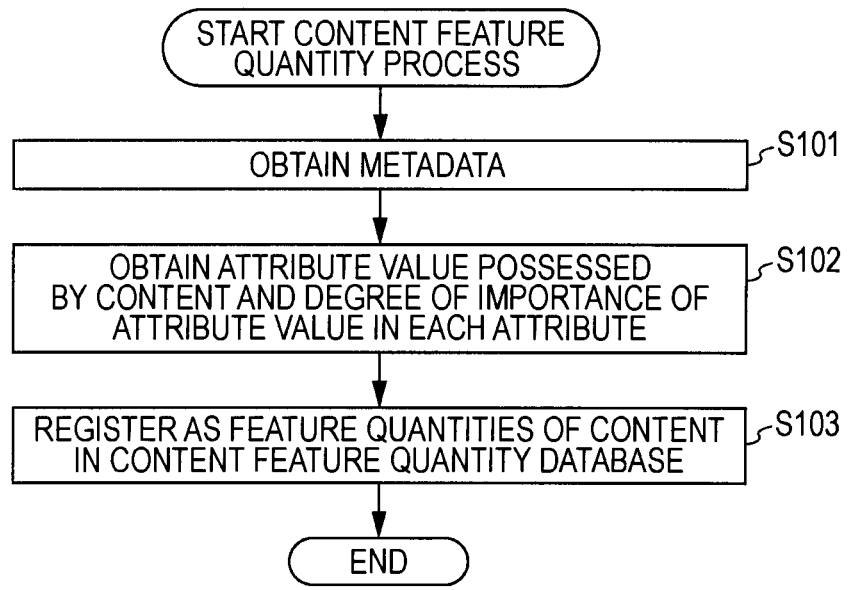
FIG. 8 is a flowchart illustrating an example of the flow of a content feature quantity process.

First, a description will be given, with reference to the flowchart of FIG. 8, of an example of the flow of a content feature quantity process. When the metadata of the content is supplied, a content feature quantity process for registering the content feature quantities in the content feature quantity database 103 is started.

When the content feature quantity process is started, in step S101, the metadata obtaining unit 101 obtains metadata.

In step S102, the extraction unit 141 of the mining engine 102 refers to the metadata so as to obtain the attribute value possessed by the content corresponding to the metadata and the degree of importance of the attribute value with regard to each attribute.

In step S103, the registration unit 142 of the mining engine 102 registers, in the content feature quantity database 103, the information (the attribute value and the degree of importance of the attribute value) extracted from the metadata in step S102 as content feature quantities.

Upon completion of the process of step S103, the content feature quantity process is completed.

Next, a description will be given, with reference to the flowchart of FIG. 9, of an example of the flow of a user preference process. When the operation log of the user is supplied, a user preference process for registering the user preferences in the user preference database 106 is started.

When the user preference process is started, in step S121, the operation log obtaining unit 104 obtains the operation log.

In step S122, the extraction unit 151 of the preference extraction engine 105 extracts the attribute value of each attribute and the degree of preference of the user with respect to the attribute value, which are contained in the operation log.

In step S123, the registration unit 152 of the preference extraction engine 105 registers, in the user preference database 106, the information (the attribute value and the degree of preference of the user with respect to the attribute value) extracted from the operation log in step S122 as user preferences.

Upon completion of the process of step S123, the user preference process is completed.

Next, a description will be given, with reference to the flowchart of FIG. 10, of an example of the flow of a recommendation process. When the recommendation target content is specified, a recommendation process for recommending the related content of the recommendation target content is started.

When the recommendation process is started, in step S141, the content feature quantity obtaining unit 161 of the recommendation engine 107 obtains the content feature quantities of the recommendation target item (content) from the content feature quantity database 103.

In step S142, the user preference obtaining unit 162 of the recommendation engine 107 obtains the user preferences of the recommendation target user from the user preference database 106.

In step S143, the correction unit 163 of the recommendation engine 107 performs a correction process for correcting the content feature quantities on the basis of the user preferences. The details of the correction process will be described later.

In step S144, the matching unit 164 of the recommendation engine 107 performs matching between the correction result and the content feature quantities of the other content, and calculates the degree of similarity between the recommendation target content and the other content. The details of the matching process will be described later.

In step S145, on the basis of the matching result in step S144, the related content selection unit 165 of the recommendation engine 107 selects the related content of the recommendation target content from within the other content whose feature quantities have been registered in the content feature quantity database 103.

In step S146, the recommendation information providing unit 108 provides the information of the related content as recommendation information to the user.

Upon completion of the process of step S146, the recommendation process is completed.

Next, a description will be given, with reference to the flowchart of FIG. 11, of an example of the flow of a correction process performed in step S143 of FIG. 10.

When the correction process is started, in step S161, the comparison unit 171 compares the content feature quantities of the recommendation target content with each attribute value of the user preferences of the recommendation target user.

In step S162, the amplification unit 172 amplifies the degree of importance of the attribute value also having the user preferences from among the attribute values possessed by the content feature quantities. In step S163, the attenuation unit 173 attenuates the degree of importance of the attribute value that is not possessed by the user preferences from among the attribute values possessed by the content feature quantities.

Upon completion of the correction such as that described above, the correction process is completed. The process returns to step S143 of FIG. 10, where processing at and subsequent to step S144 is performed.

Figure 12:
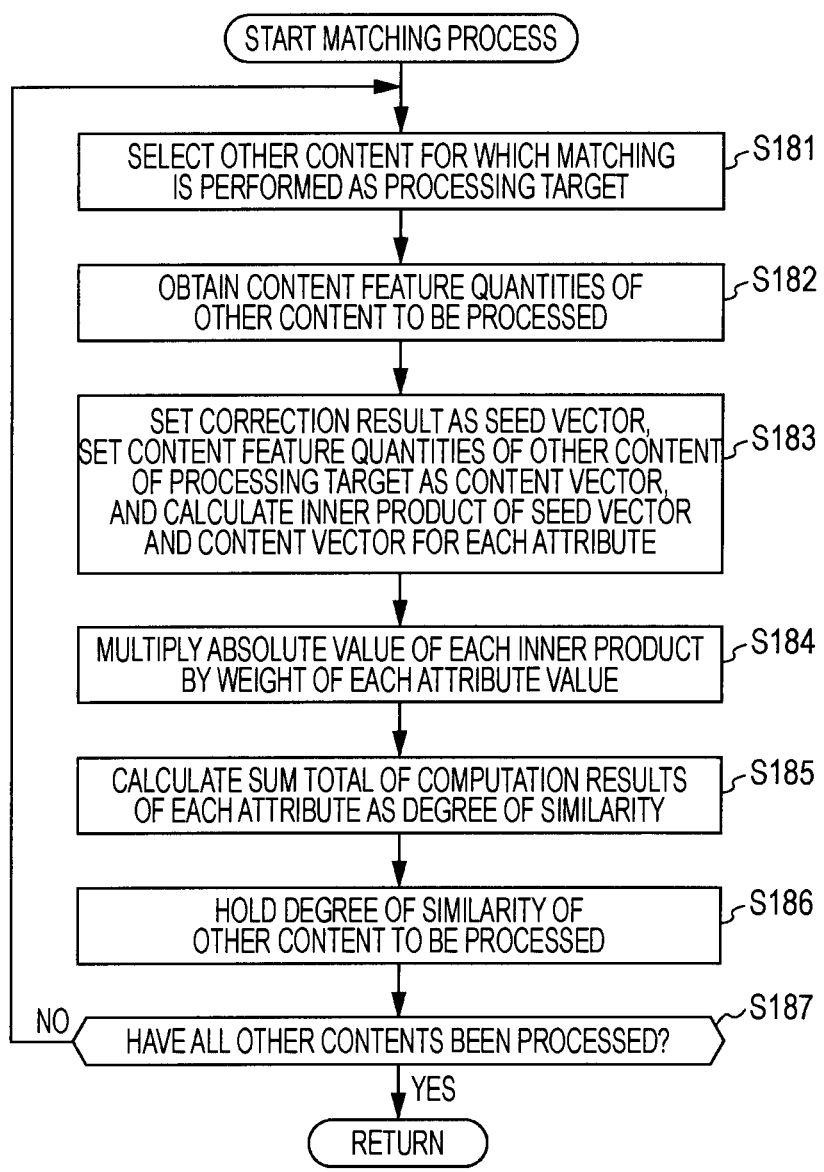
FIG. 12 is a flowchart illustrating an example of the flow of a matching process.

Next, a description will be given, with reference to the flowchart of FIG. 12, of an example of the flow of a matching process performed in step S144 of FIG. 10.

When the matching process is started, in step S181, the processing target selection unit 181 selects one of content (the other content) whose feature quantities have been registered in the content feature quantity database 103 as a target for which matching is performed.

In step S182, the content feature quantity obtaining unit 182 obtains, from the content feature quantity database 103, the content feature quantities of the other content for which processing is performed.

In step S183, by using the correction result obtained by the correction process as a seed vector and by using the content feature quantities of the other content to be processed as a content vector, the degree of similarity calculation unit 183 calculates the inner product between the attribute vector of the seed vector and the attribute vector of the content vector for each attribute.

In step S184, the degree of similarity calculation unit 183 multiplies the weight of each attribute value by the absolute value of each inner product. In step S185, the degree of similarity calculation unit 183 calculates the sum total of the computation results of the attributes as the degree of similarity.

In step S186, the degree of similarity holding unit 184 holds the calculated degree of similarity of the other content to be processed.

In step S187, the processing target selection unit 181 determines whether or not all the other content whose feature quantities have been registered in the content feature quantity database 103 has been processed. When it is determined that the other content that has not yet been processed exists, the process returns to step S181, where processing at and subsequent to step S181 is repeated.

When it is determined in step S187 that the degrees of similarity of all the other content have been calculated, the matching process is completed. The process returns to step S144 of FIG. 10, where processing at and subsequent to step S145 is performed.

As described above, it is possible for the recommendation device 100 to cause user preferences to be reflected in the content feature quantities of the recommendation target content, so that by using the reflection result, the related content of the recommendation target content can be searched for and recommended. As a result, it is possible for the recommendation device 100 to recommend content whose features as the content resemble and also match the preferences of the user when the related content of the recommendation target content is to be recommended.

Furthermore, as described above, when the correction unit 163 of the recommendation engine 107 corrects the content feature quantities of the recommendation target content by using the user preferences, the user preferences are reflected without increasing the number of attribute values contained in the content feature quantities. Consequently, it is possible for the matching unit 164 of the recommendation engine 107 to easily calculate the degree of similarity without unnecessarily increasing the number of computations.

Therefore, it is possible for the recommendation device 100 to more easily recommend content that is more suitable for the user.

As a method differing from the method such as that described above, a method is considered in which related content is calculated by comparing the value of a predetermined parameter common to all the content like, for example, the above-mentioned attribute. In the case of this method, since it is sufficient to simply compare the value of each predetermined parameter, the calculation of the degree of similarity is easy. Furthermore, in a case where the user preferences are to be reflected, since it is sufficient to change the value of each predetermined parameter, the influence on the load of degree of similarity calculation is small.

However, in the case of this method, it is necessary to provide in advance a parameter common to all the content. In the case of the embodiment of the present invention, the attribute value can be set as desired for each content. If a degree of freedom similar to that case is to be obtained, it is necessary to provide a large number of parameters, thereby increasing the load. Furthermore, dealing with a new parameter is not possible. Therefore, as a practical problem, in this method, the degree of freedom of the representation of the feature quantities of the content is decreased to less than that of the method of the embodiment of the present invention, and it may not be possible to sufficiently represent the features of the content. That is, the degree to which the recommendation content and the recommendation target content are related and the reflection degree of the user preferences might be reduced.

In comparison, in the case of the method of the above-mentioned embodiment of the present invention, the content feature quantities, the attribute values of the user preferences, and the degree of importance (degree of preference) can be set as desired for each content. Consequently, it is possible to more accurately represent the features of the content and the user preferences, and it is possible to recommend content having a higher relation degree with recommendation target content and a higher reflection degree of the user preferences.

As in the embodiment of the present invention, in a case where the content feature quantities, the attribute values of the user preferences, and the degree of importance (the degree of preference) can be set as desired, when the user preferences are to be reflected on the content feature quantities, if the attribute values of the user preferences are simply added to the group of attribute values of the content feature quantities, the number of attribute values of the content feature quantities after correction might be increased, and the load of the degree of similarity computation might be increased.

In comparison, in the case of the method of the above-mentioned embodiment of the present invention, only the degree of importance of the attribute value that exists in the content feature quantities before correction is corrected, and the attribute value that is contained in only the user preferences is not added to the degree of importance of content. Consequently, it is possible to suppress an increase in the load of the degree of similarity computation.

That is, it is possible for the recommendation device 100 to more easily recommend content that is more suitable for the user.

In the foregoing, operations in a case where the preferences of the user exist have been described. As a method capable of searching for and recommending related content also in a case where the preferences of the recommendation target user do not yet exist, such as in the initial period in which the system is used, a vector in which specific preferences that are generated in advance are represented may be used.

2. Second Embodiment

Configuration of Recommendation Device

Figure 13:
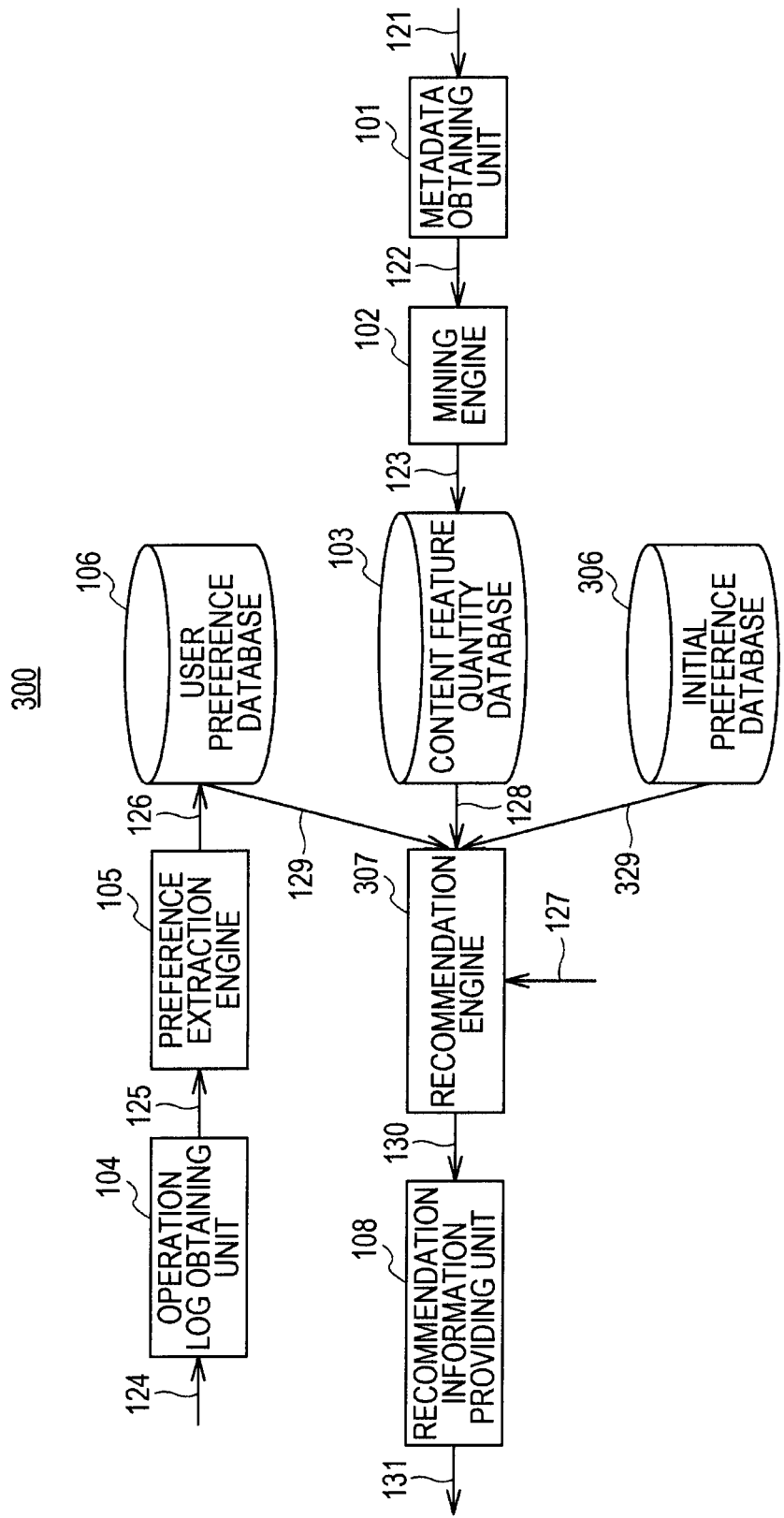
FIG. 13 is a block diagram illustrating another example of the configuration of the recommendation device to which the present invention is applied.

FIG. 13 is a block diagram showing another example of the configuration of the recommendation device to which the present invention is applied.

A recommendation device 300 shown in FIG. 13 is a device basically similar to the recommendation device 100 shown in FIG. 1, and is a device that recommends related content that is related to recommendation target content specified by the recommendation target user. That is, the recommendation device 300 basically has a configuration similar to that of the recommendation device 100, and performs similar processing.

However, in the initial state in which the user preferences of the recommendation target user have not been registered in the user preference database 106 or in a state close to an initial state in which the amount of information is insufficient, such as at the system initialization time or at the time immediately after user registration, the recommendation device 300 performs the correction of the content feature quantities by using the initial preferences, which are preference information that has been prepared in advance.

As shown in FIG. 13, the recommendation device 300 includes, in addition to the configuration of the recommendation device 100, an initial preference database 306. Furthermore, the recommendation device 300 includes a recommendation engine 307 taking the place of the recommendation engine 107.

The initial preference database 306 is a database for registering information regarding preferences similarly to the user preference database 106, but registers the preferences in an initial state, which are common to all the users (hereinafter referred to as initial preferences), rather than the preferences for each user. Therefore, the structure of registered information is similar to the structure of the user preference database 106 described with reference to FIG. 4 and is made up of attribute values, a degree of preference, and the like.

The attribute values, the degree of preference, and the like forming the initial preferences are arbitrary. For example, it is also recommended that the initial preferences may be initial preferences with which programs whose audience rating is high are recommended. Furthermore, metadata of a large amount of content is statistically processed, and initial preferences formed by only the attribute values that are statistically important are provided.

Furthermore, the attribute values and the degree of preference may also be set only with regard to predetermined attributes so that only specific attributes of the content feature quantities are emphasized when the content feature quantities are corrected. Furthermore, a vector obtained by combining a part or the whole of the content feature quantities (content vector) registered in the content feature quantity database 103 may be set as initial preferences.

The recommendation engine 307 determines whether or not the user preference database 106 is in an initial state (or in a state close to an initial state). In the case of such an initial state, the recommendation engine 307 obtains the initial preferences from the initial preference database 306, corrects the content feature quantities of the recommendation target content by using the initial preferences, and generates a seed vector.

The configuration of the recommendation engine 307 is similar to the case of the recommendation engine 107 described with reference to FIG. 2C.

Figure 14:
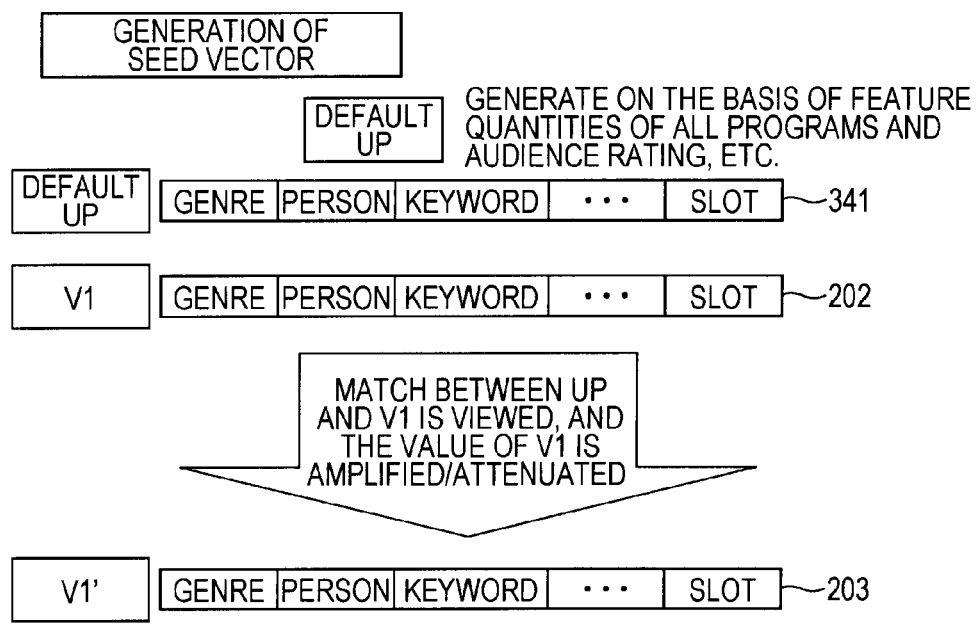
FIG. 14 illustrates an example of a state in which a seed vector is generated.

FIG. 14 illustrates an example of a state in which a seed vector is generated.

Similarly to the case of the user preferences described with reference to FIG. 5, initial preferences, which are represented as a vector, will be referred to as an initial preference vector. That is, the initial preference vector is also a combined vector of attribute vectors. The degree of preference of each attribute value indicates the magnitude of each attribute value component.

As shown in FIG. 14, the correction unit 163 of the recommendation engine 307 compares the attribute values between each attribute vector of the content vector 202 (V1) and each attribute vector of the initial preference vector 341 (Default UP), and amplifies or attenuates the degree of importance on the basis of the comparison result, thereby generating a seed vector 203 (V1') in which the content vector 202 is corrected.

The processes other than the above are the same as those in the case of the recommendation device 100, and accordingly, descriptions thereof are omitted.

Flow of Processing

Also, in the case of this recommendation device 300, a content feature quantity process and a user preference process are performed similarly to the case of the recommendation device 100.

Figure 15:
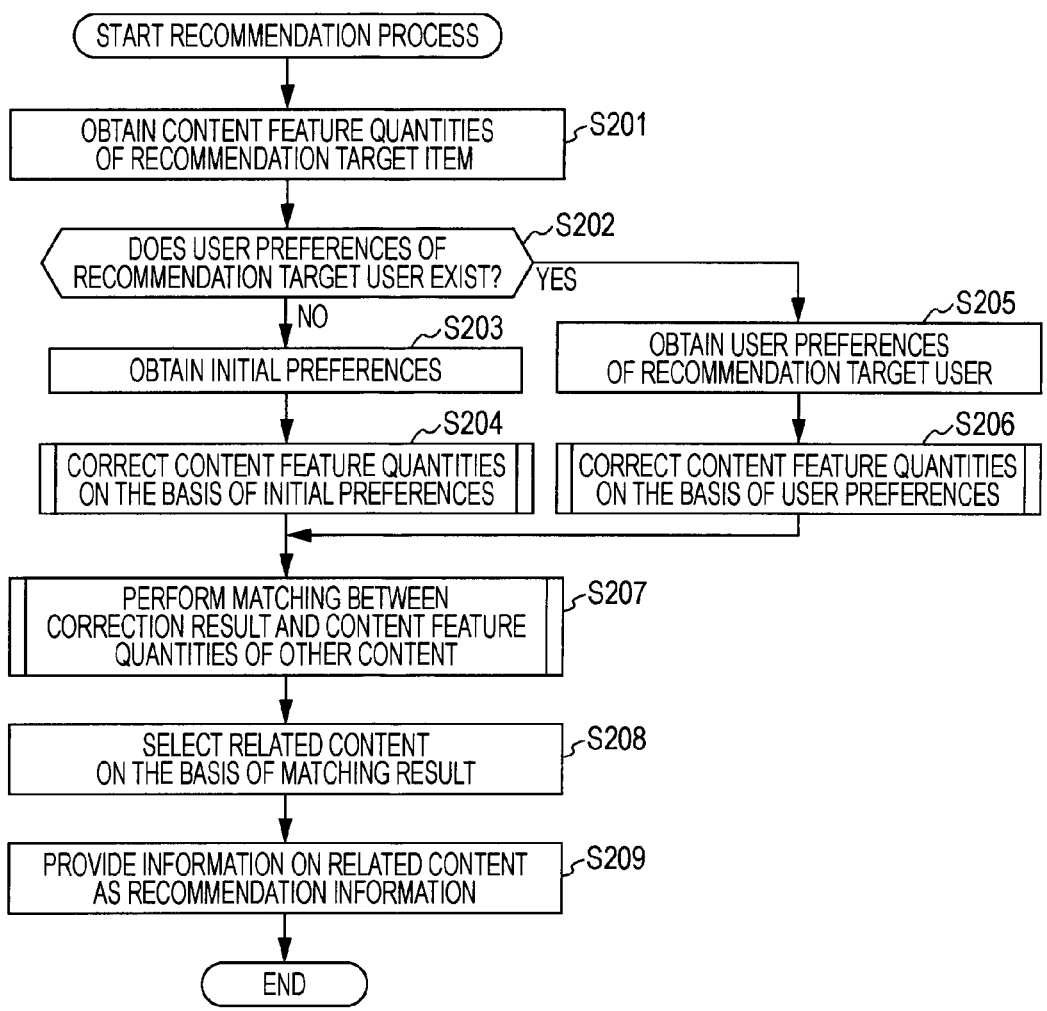
FIG. 15 is a flowchart illustrating another example of the flow of the recommendation process.

An example of the flow of a recommendation process in the case of this recommendation device 300 will be described with reference to the flowchart of FIG. 15.

When the recommendation process is started, in step S201, the content feature quantity obtaining unit 161 of the recommendation engine 307, similarly to the case of step S141, obtains the content feature quantities of the recommendation target item from the content feature quantity database 103.

In step S202, the user preference obtaining unit 162 of the recommendation engine 307 determines whether or not the user preferences of the recommendation target user exist. When it is determined that the user preferences do not exist, the process proceeds to step S203.

In step S203, the user preference obtaining unit 162 of the recommendation engine 307 obtains initial preferences in place of the user preferences of the recommendation target user from the initial preference database 306.

In step S204, the correction unit 163 of the recommendation engine 307 corrects the content feature quantities of the recommendation target content on the basis of the initial preferences. This correction process is the same as the correction process in the case of the recommendation device 100 described with reference to FIG. 11 except that the initial preferences are used. Accordingly, the description thereof is omitted.

Upon completion of the process of step S204, the process proceeds to step S207.

Furthermore, when it is determined in step S202 that the user preferences exist (a sufficient amount of information exists), the process proceeds to step S205. The processes of steps S205 and S206 are performed in the same manner as the processes of steps S142 and S143 of FIG. 10, respectively.

Upon completion of the process of step S206, the process proceeds to step S207.

Figure 10:
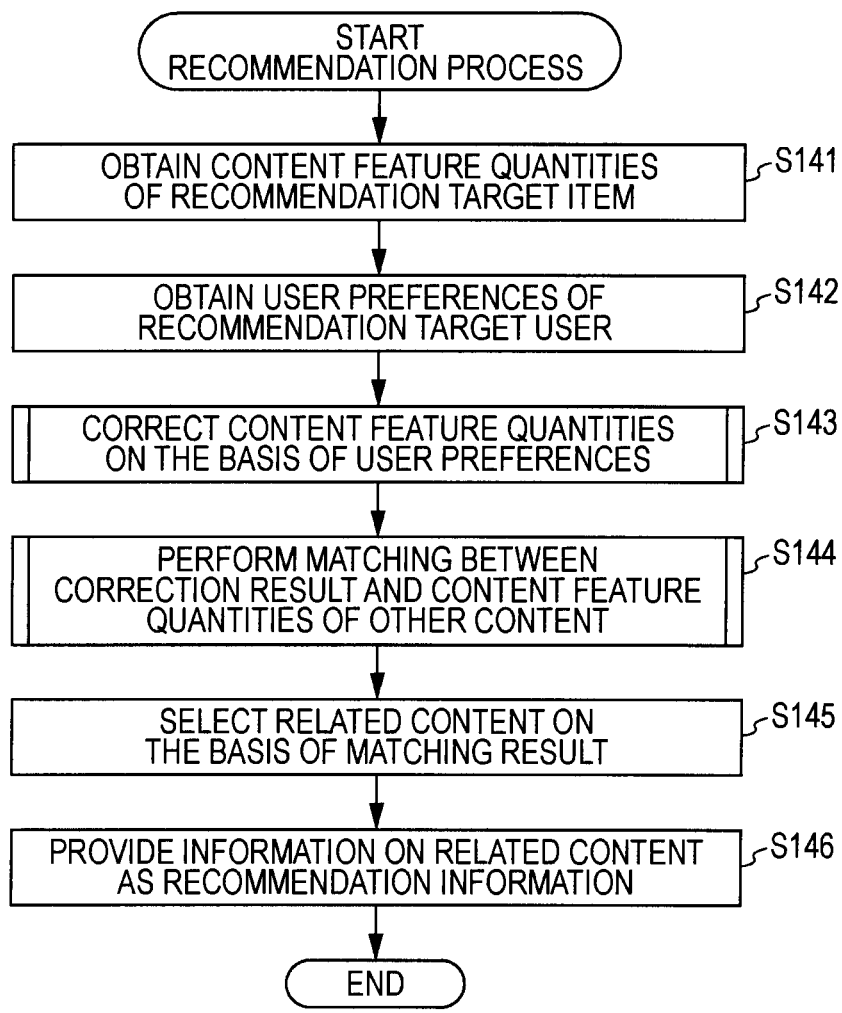
FIG. 10 is a flowchart illustrating an example of the flow of a recommendation process.
Figure 11:
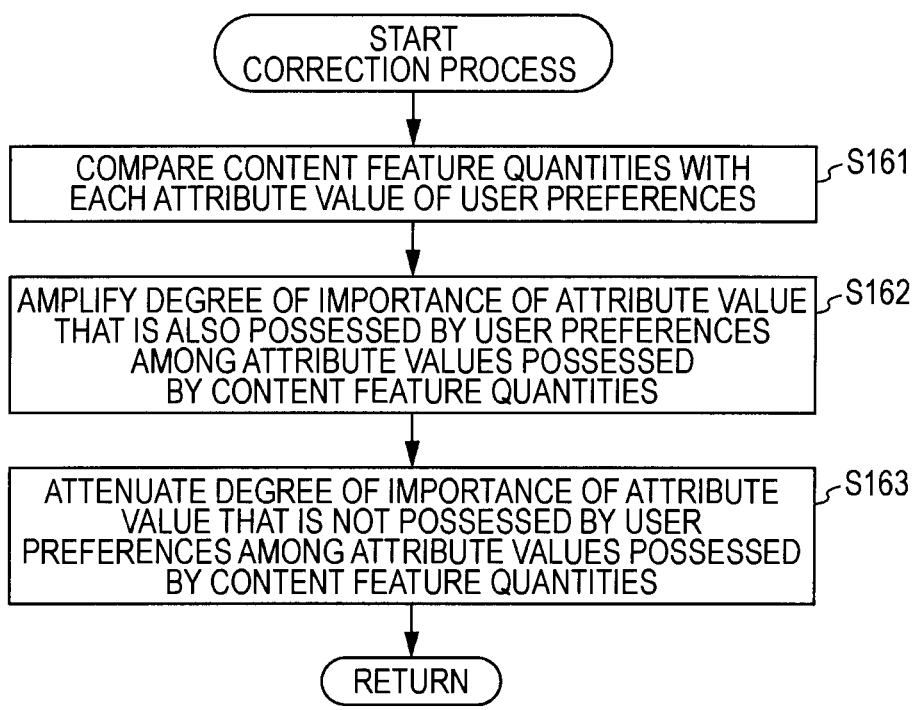
FIG. 11 is a flowchart illustrating an example of the flow of a correction process.

The processes of steps S207 to S209 are performed in the same manner as the processes of steps S144 to S146 of FIG. 10, respectively.

Upon completion of the process of step S209, the recommendation process is completed.

By using the initial preferences in the manner described above, it is possible for the recommendation device 300 to easily recommend content that should be more recommended under some sort of index by a method similar to that in the case where the user preferences are used even in a state in which the user preferences are insufficient.

The initial preferences may be calculated when these are obtained by the user preference obtaining unit 162.

3. Third Embodiment

Configuration of Recommendation Device

In the foregoing, it has been described that initial preferences are provided. In addition, in accordance with the amount of information (the degree of maturity) to be registered, the registered user preferences and the initial preferences may be mixed, and the mixed result (merged user preferences) may be used to correct the content feature quantities.

In this case, the configuration of the recommendation device is basically the same as the recommendation device 300 shown in FIG. 13. Therefore, in the following, a description will be given by using the recommendation device 300.

FIGS. 16A, 16B, and 16C are block diagrams showing examples of a detailed configuration of each unit of the recommendation device 300 in this case. Descriptions of the components identical to those of the recommendation device 100 (FIGS. 2A to 2E) are omitted.

The recommendation device 300 in this case includes a preference extraction engine 355 in place of the preference extraction engine 105 of FIG. 13. As shown in FIG. 16A, the preference extraction engine 355 includes, in addition to the extraction unit 151 and the registration unit 152, a calculation unit 361 and a registration unit 362.

The calculation unit 361 calculates the amount of information of the user preferences registered in the user preference database 106, or the degree of maturity indicating the number of times of updating. That is, this degree of maturity indicates the certainty (the highness of reliability) as the information of the user preferences.

When a larger amount of information is registered or larger count information is updated with regard to a certain use, the degree of maturity of the user preferences of the user is increased (the degree of maturity is calculated by the calculation unit 361 in that manner).

The degree of maturity is calculated in accordance with, for example, Expression (2) or Expression (3) below.

$$\text{The degree of maturity} = 1.0 - (\text{the number of updating of the value of the user preference vector in most recent access/the total number of the values of the user preference vector}) \quad (2)$$

$$\text{The degree of maturity} = 1.0 - (\text{the average of the numbers of updating of the values of the user preference vector in the most recent access/the total number of the values of the user preference vector}) \quad (3)$$

Of course, the method of calculating the degree of maturity is arbitrary. The calculation unit 361 may calculate the degree of maturity by using a method other than the above.

The registration unit 362 registers the degree of maturity calculated by the calculation unit 361 in the user preference database 106. Of course, this degree of maturity is managed in such a manner as to be associated with a user.

Furthermore, as shown in FIG. 16B, the recommendation engine 307 includes, in addition to the content feature quantity obtaining units 161 through to the related content selection unit 165, an initial preference obtaining unit 371 and a merged user preference calculation unit 372.

The initial preference obtaining unit 371 obtains initial preferences from the initial preference database 306. The merged user preference calculation unit 372 mixes the user preferences of the recommendation target user, which are obtained from the user preference database 106 by the user preference obtaining unit 162, and the initial preferences obtained from the initial preference database 306 by the initial preference obtaining unit 371 at a ratio corresponding to the degree of maturity of the user preferences, and calculates the merged user preferences.

As shown in FIG. 16C, the merged user preference calculation unit 372 includes a degree of maturity obtaining unit 381 and a mixing unit 382.

The degree of maturity obtaining unit 381 obtains the degree of maturity of the user preferences of the recommendation target user, which are obtained by the user preference obtaining unit 162, from the user preference database 106. The mixing unit 382 mixes the user preferences and the initial preferences at a ratio corresponding to the obtained degree of maturity, and generates merged user preferences.

For example, in a case where the user preferences have not been registered (the degree of maturity is 0 or the user preferences do not exist), the mixing unit 382 uses only the initial preferences.

Furthermore, when 0<the degree of maturity<0.2, the mixing unit 382 mixes the initial preferences and the user preferences at a ratio of 0.8 to 0.2. When 0.2<the degree of maturity<0.4, the mixing unit 382 mixes the initial preferences and the user preferences at a ratio of 0.6 to 0.4. When 0.4<the degree of maturity<0.6, the mixing unit 382 mixes the initial preferences and the user preferences at a ratio of 0.4 to 0.6. When 0.6<the degree of maturity<0.8, the mixing unit 382 mixes the initial preferences and the user preferences at a ratio of 0.2 to 0.8.

Furthermore, when 0.8<the degree of maturity, the mixing unit 382 uses only the user preferences.

This method of mixing is arbitrary. For example, the initial preference vector and the user preference vector may be combined. At this time, these vectors are combined after the above-mentioned coefficients of the ratios are multiplied by the respective vectors. As a result of the above, it is possible for the mixing unit 382 to mix the initial preferences and the user preferences at a ratio corresponding to the degree of maturity.

Flow of Processing

Figure 17:
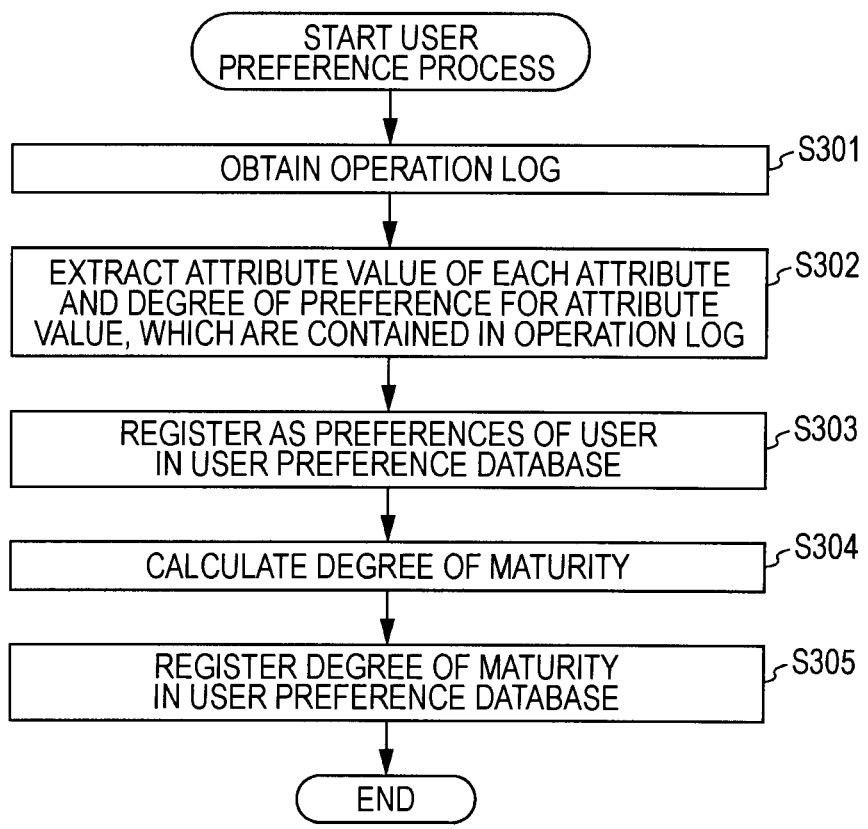
FIG. 17 is a flowchart illustrating another example of the flow of the user preference process.

Next, a description will be given of the flow of processing in this case. First, a description will be given, with reference to the flowchart of FIG. 17, of an example of the flow of a user preference process in a case where a degree of maturity is registered.

Figure 9:
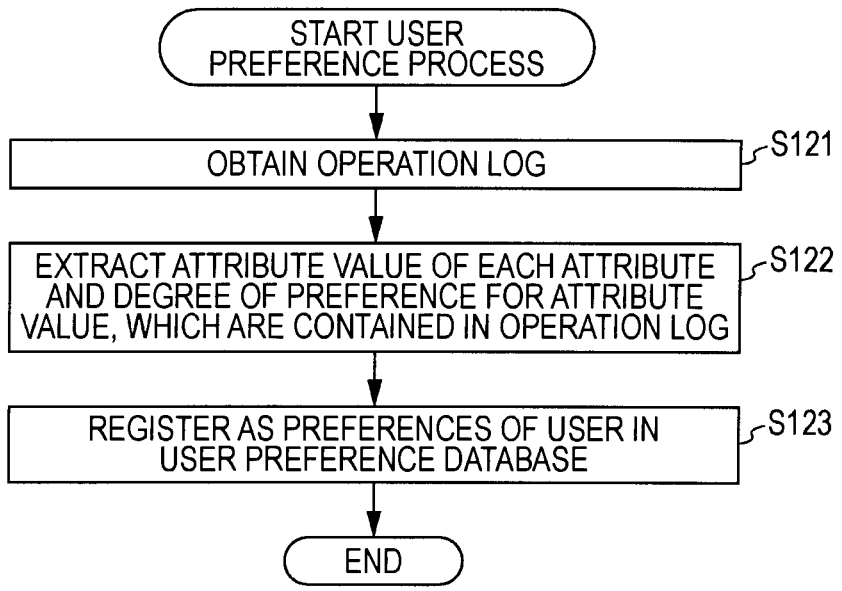
FIG. 9 is a flowchart illustrating an example of the flow of a user preference process.

When the user preference process is started, the processes of steps S301 to S303 are performed in the same manner as in steps S121 to S123 of FIG. 9, and the user preferences are registered in the user preference database 106.

In step S304, the calculation unit 361 of the preference extraction engine 355 calculates the degree of maturity with regard to a user corresponding to the registered user preferences. In step S305, the registration unit 362 of the preference extraction engine 355 registers the degree of maturity calculated in step S304 in the user preference database 106.

Upon completion of the process of step S305, the user preference process is completed.

Figure 18:
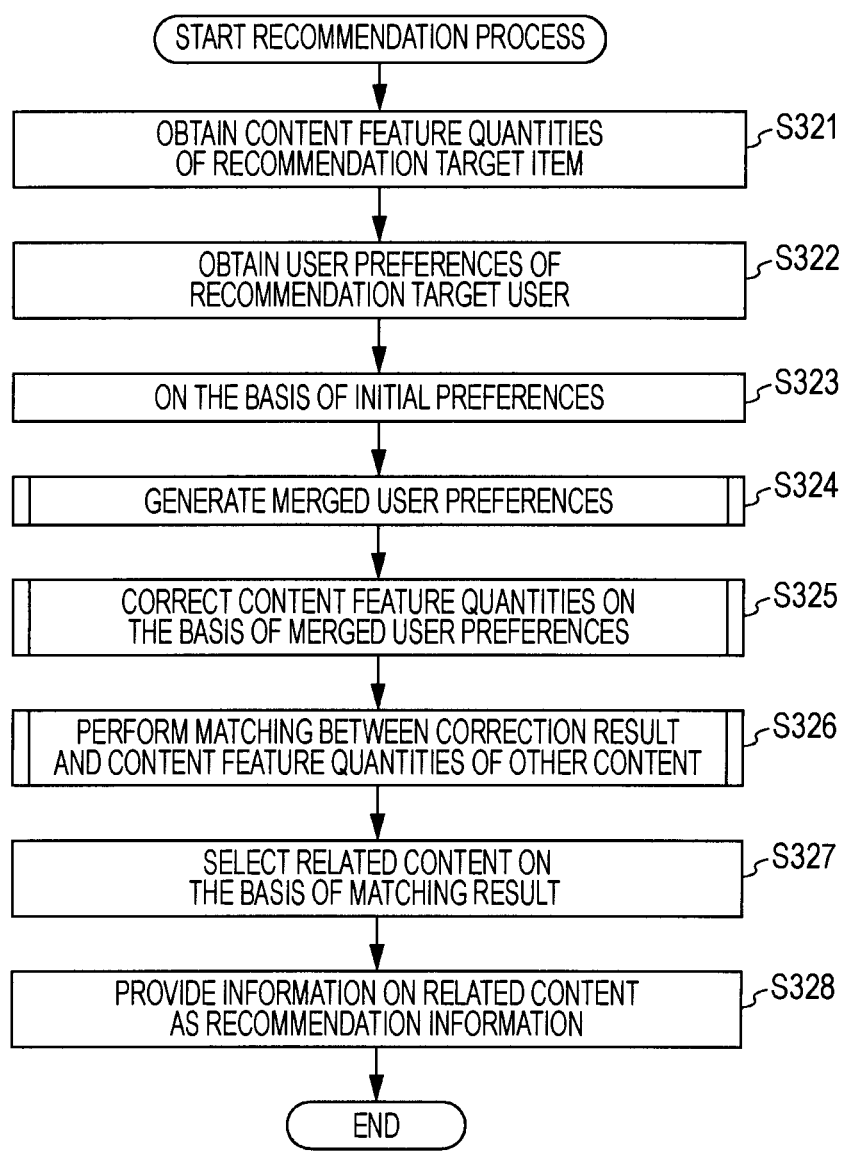
FIG. 18 is a flowchart illustrating another example of the flow of the recommendation process.

Next, a description will be given, with reference to the flowchart of FIG. 18, of an example of the flow of a recommendation process in this case.

When the recommendation target process is started, the processes of steps S321 and S322 are performed in the same manner as the processes of steps S141 and S142 of FIG. 10, respectively.

In step S323, the initial preference obtaining unit 371 obtains initial preferences from the initial preference database 306.

In step S324, the merged user preference calculation unit 372 generates merged user preferences. The details of the merged user preference generation process will be described later.

In step S325, the correction unit 163 corrects the content feature quantities on the basis of the merged user preferences generated in step S324. This correction process is performed in the same manner as the correction process described with reference to the flowchart of FIG. 11 except that merged user preferences are used in place of the user preferences. Accordingly, descriptions of the details of the correction process are omitted.

Upon completion of the process of step S325, the processes of steps S326 to S328 are performed in the same manner as the processes of steps S144 to S146 of FIG. 10, respectively.

Upon completion of the process of step S328, the recommendation process is completed.

Figure 19:
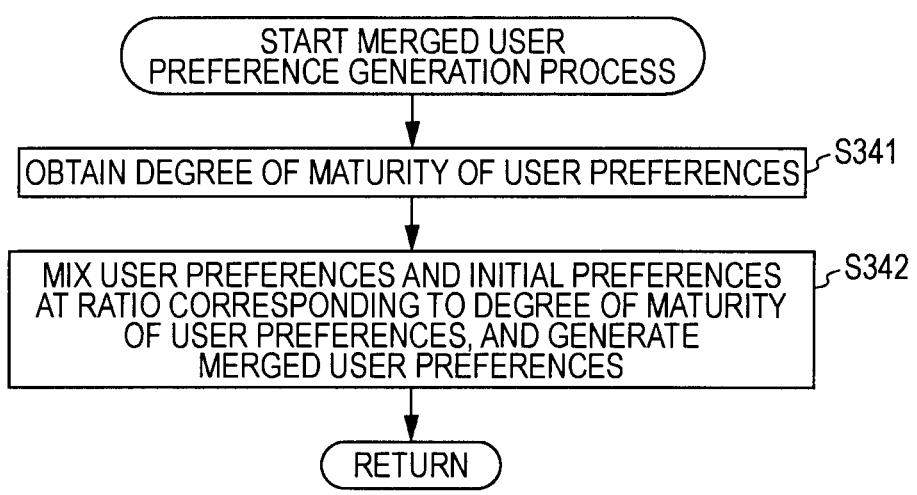
FIG. 19 is a flowchart illustrating an example of the flow of a merged user preference generation process.

Next, a description will be given, with reference to the flowchart of FIG. 19, of an example of the flow of a merged user preference generation process performed in step S324 of FIG. 18.

When the merged user preference generation process is started, in step S341, the degree of maturity obtaining unit 381 obtains the degree of maturity of the user preferences obtained in the recommendation process from the user preference database 106.

In step S342, the mixing unit 382 mixes the user preferences and the initial preferences at a ratio corresponding to the degree of maturity of the user preferences, and generates merged user preferences.

Upon completion of the process of step S342, the merged user preference generation process is completed. The process then returns to step S324 of FIG. 18, where processing at and subsequent to step S325 is performed.

As described above, by mixing the initial preferences and the user preferences on the basis of the degree of maturity of the user preferences, it is possible to gradually change the recommendation content on the basis of the degree of maturity of the user preferences. As a consequence, as a result of shifting from the initial state in which the degree of maturity is low to the normal state in which the degree of maturity is sufficiently high, it is possible to suppress a sudden change in the recommendation content. That is, even in a state in which the degree of maturity is low, it is possible for the recommendation device 300 to recommend content suitable for the user without completely ignoring the small amount of registered user preferences.

As described above, the recommendation target (item) is arbitrary, and the recommendation target content and the recommendation content may be mutually different types of content. For example, a movie may be recommended on the basis of BGM. Furthermore, a scene in which the BGM is used may be recommended.

Furthermore, the metadata may be any information as long as information regarding an item is contained, and may be information that exists independently of the content data.

The attribute values serving as the content feature quantities may be extracted from the metadata or may be extracted from the item (content data). For example, the features (for example, luminance, croma, etc.) serving as an image of a frame image, which are extracted by performing image analysis or the like, may be used as attribute values.

4. Fourth Embodiment

Configuration of Television Receiver

The above-mentioned recommendation device may include other functions. For example, the recommendation device may be used as a television receiver. In other words, the recommendation device may be formed as a partial configuration (processing unit) of some sort of device.

Figure 20:
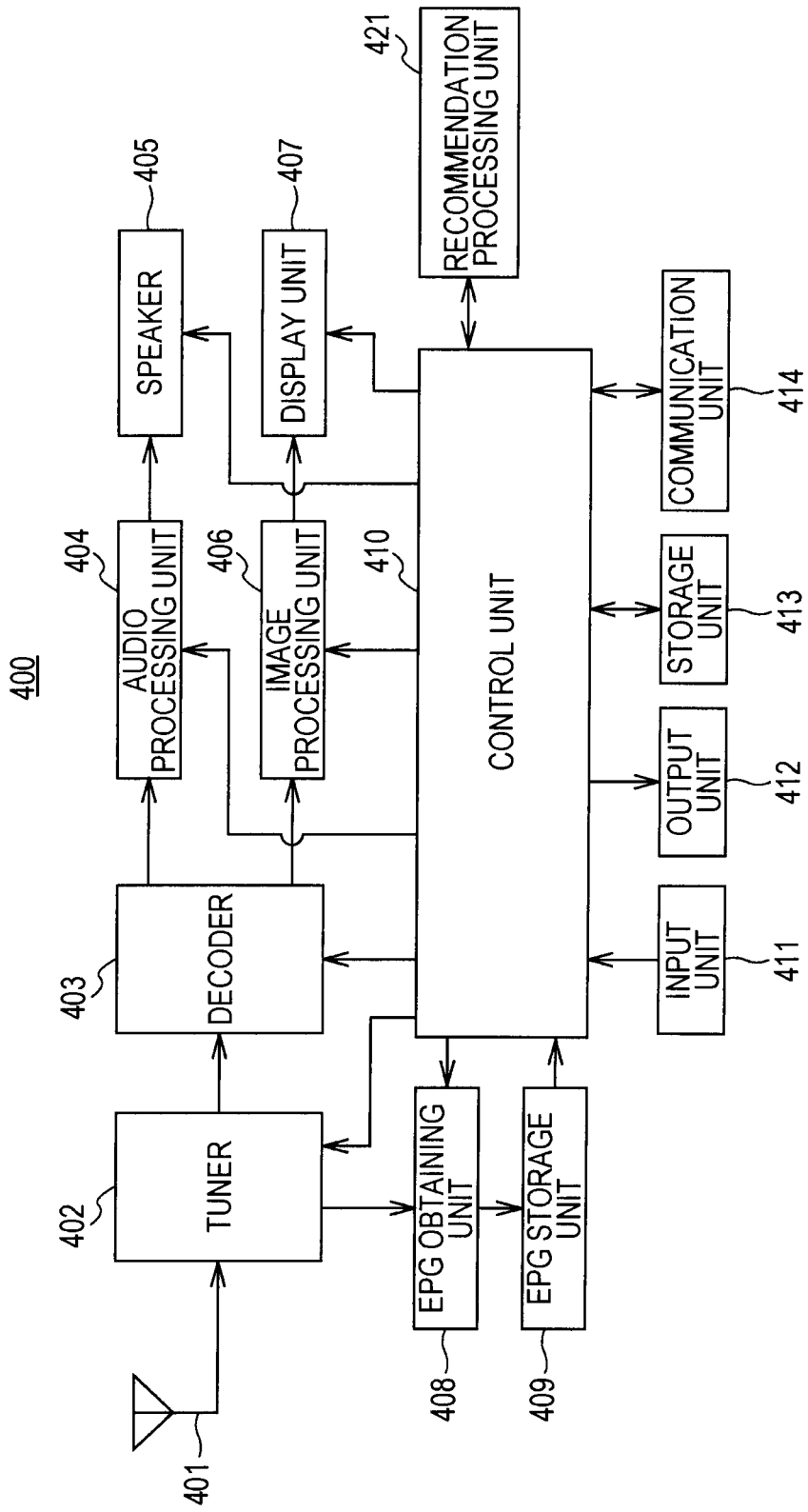
FIG. 20 is a block diagram illustrating an example of the configuration of a television receiver to which the present invention is applied.

FIG. 20 is a block diagram showing an example of the configuration of a television receiver to which the present invention is applied.

A television receiver 400 shown in FIG. 20 is a device that receives a television signal broadcast from a broadcast station and that displays a video thereof, and that outputs audio.

The television receiver 400 includes an antenna 401, a tuner 402, a decoder 403, an audio processing unit 404, a speaker 405, an image processing unit 406, and a display unit 407.

Regarding a television signal received through an antenna 401, a signal of a channel selected in a tuner 402 is demodulated, and content data (image data, sound data etc.) is obtained. The decoder 403 decodes the content data, supplies the sound data to the audio processing unit 404, and supplies the image data to the image processing unit 406.

Signal processing is performed on the audio data by the audio processing unit 404, and the sound is output from the speaker 405.

Image processing is performed on the image data by the image processing unit 406, and the image is displayed by the display unit 407.

Furthermore, the television receiver 400 includes an EPG obtaining unit 408 and an EPG storage unit 409. The EPG obtaining unit 408 obtains the EPG data received by the tuner 402, and stores it in EPG storage unit 409. The EPG storage unit 409 stores a predetermined amount of up-to-date EPG data.

The television receiver 400 further includes a control unit 410. The control unit 410 controls each unit of the tuner 402 through to the EPG storage unit 409.

Furthermore, the control unit 410 reads the EPG data stored in the EPG storage unit 409 as necessary, generates images of the program table, and causes the display unit 407 to display the images.

The television receiver 400 further includes an input unit 411, an output unit 412, a storage unit 413, and a communication unit 414.

The input unit 411 is an arbitrary input device including, for example, a control switch, a keyboard, and a remote controller, and accepts user operation and the like. Furthermore, the input unit 411 has an input terminal, and accepts data, a program, and the like, which are supplied from another device. The input unit 411 supplies various received information to the control unit 410. The control unit 410 performs a control process and the like on the basis of the various information received through the input unit 411.

The output unit 412 is constituted by arbitrary output devices including, for example, a monitor, a speaker, a lamp, an external output terminal, etc. The output unit 412 causes various information supplied from the control unit 410 to be output from an appropriate output device.

The storage unit 413 is constituted by, for example, a hard disk, a flash memory, or the like, and stores information (programs, data, etc.) supplied from the control unit 410. Furthermore, the storage unit 413 supplies the stored information to the control unit 410.

The communication unit 414 is a communication device for performing communication with other apparatuses or devices. The communication unit 414 includes, for example, an Ethernet interface, an IEEE 802.11x interface, a USB interface, a Bluetooth interface, and the like. The communication method is arbitrary, and any communication device can be used. The communication unit 414 is controlled by the control unit 410, and transmits information supplied from the control unit 410 to a communication party or supplies information supplied from a communication party to the control unit 410.

Furthermore, the television receiver 400 includes a recommendation processing unit 421. The recommendation processing unit 421 has a configuration similar to those of the above-mentioned recommendation device 100 and recommendation device 300, and performs similar processing.

For example, the recommendation processing unit 421 may be controlled by the control unit 410, so that when the user searches for a program, content selected in the program table is used as recommendation target content, and the related content thereof is recommended. The recommendation information output by the recommendation processing unit 421 is supplied to the display unit 407 and is displayed on a monitor or the like by the control unit 410, thereby being presented to the recommendation target user (the user who selected content in the program table).

Furthermore, the recommendation processing unit 421 may be controlled by the control unit 410, so that the user searches for related content of the program that is currently being viewed, and recommends the related content.

Furthermore, in the case where the television receiver 400 has a video recording function (for example, the received content data can be stored in the storage unit 413), the recommendation processing unit 421 may set content recorded by the user or content scheduled to be recorded as recommendation target content and may recommend the related content thereof.

As described above, by setting the above-mentioned recommendation device as a recommendation processing unit and installing it in the device in which the user processes content, it is possible for the recommendation processing unit to recommend related content with regard to content on which processing is performed. That is, since the device can easily recommend content that is more suitable for the user, the convenience of the operation by the user can be improved.

Such a recommendation processing unit can be applied to any device other than the television receiver 400. For example, the device may be a cellular phone, a Smartphone, a notebook personal computer, a camera, a recorder, or the like.

5. Fifth Embodiment

System Configuration

Furthermore, the device that processes recommendation target content or the device that provides other content for which related content is searched may be a device different from the recommendation device.

Figure 21:
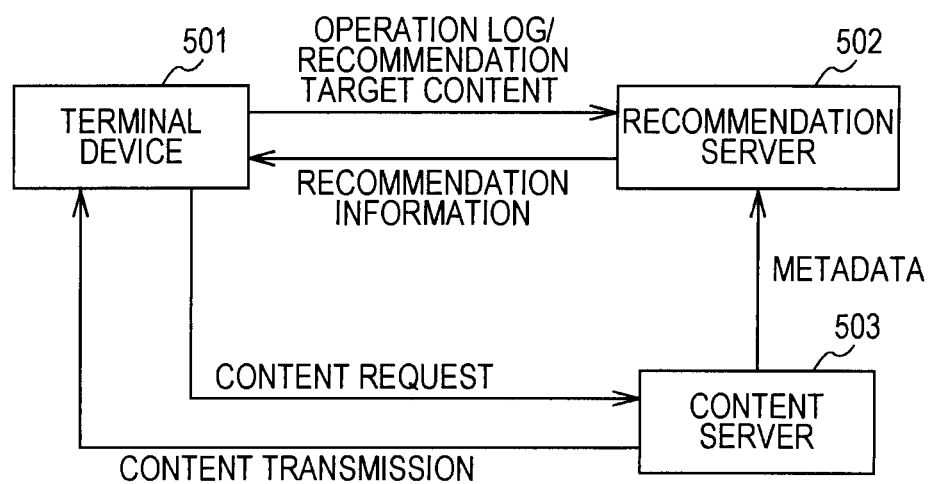
FIG. 21 is a block diagram illustrating an example of the configuration of a recommendation system to which the present invention is applied.

FIG. 21 is a block diagram showing an example of the configuration of a recommendation system to which the present invention is applied.

As shown in FIG. 21, a recommendation system 500 is a system that recommends related content of recommendation target content. The recommendation system 500 includes a terminal device 501, a recommendation server 502, and a content server 503. That is, the recommendation system 500 is constituted by a plurality of devices.

The terminal device 501 is a device that is operated by the user and is a device that processes content. As shown in FIG. 21, the terminal device 501 supplies an operation log and the specification of recommendation target content to the recommendation server 502, and obtains recommendation information corresponding to the recommendation target content from the recommendation server 502. That is, the terminal device 501 is a device that receives the recommendation of the related content from the recommendation server 502.

The terminal device 501 is further a device that processes (e.g., views, etc.) the content provided by the content server 503. The terminal device 501 requests the content server 503 for content, and obtains the requested content from the content server 503.

The terminal device 501 sets the obtained content as recommendation target content, and supplies the specification thereof to the recommendation server 502 or notifies the recommendation server 502 of the information regarding the obtained content as an operation log. Of course, both of them may be performed.

The recommendation server 502 is a device similar to the above-mentioned recommendation device 100 and recommendation device 300, and performs the recommendation of the content to the terminal device 501 (the user of the terminal device 501). The recommendation server 502 obtains the metadata of the content provided by the content server 503 from the content server 503. The recommendation server 502 generates content feature quantities from the metadata.

The content server 503 is a device that provides content to the terminal device 501.

The devices perform exchange of information with one another via an arbitrary communication medium, such as a network typified by, for example, the Internet.

Flow of Processing

Figure 22:
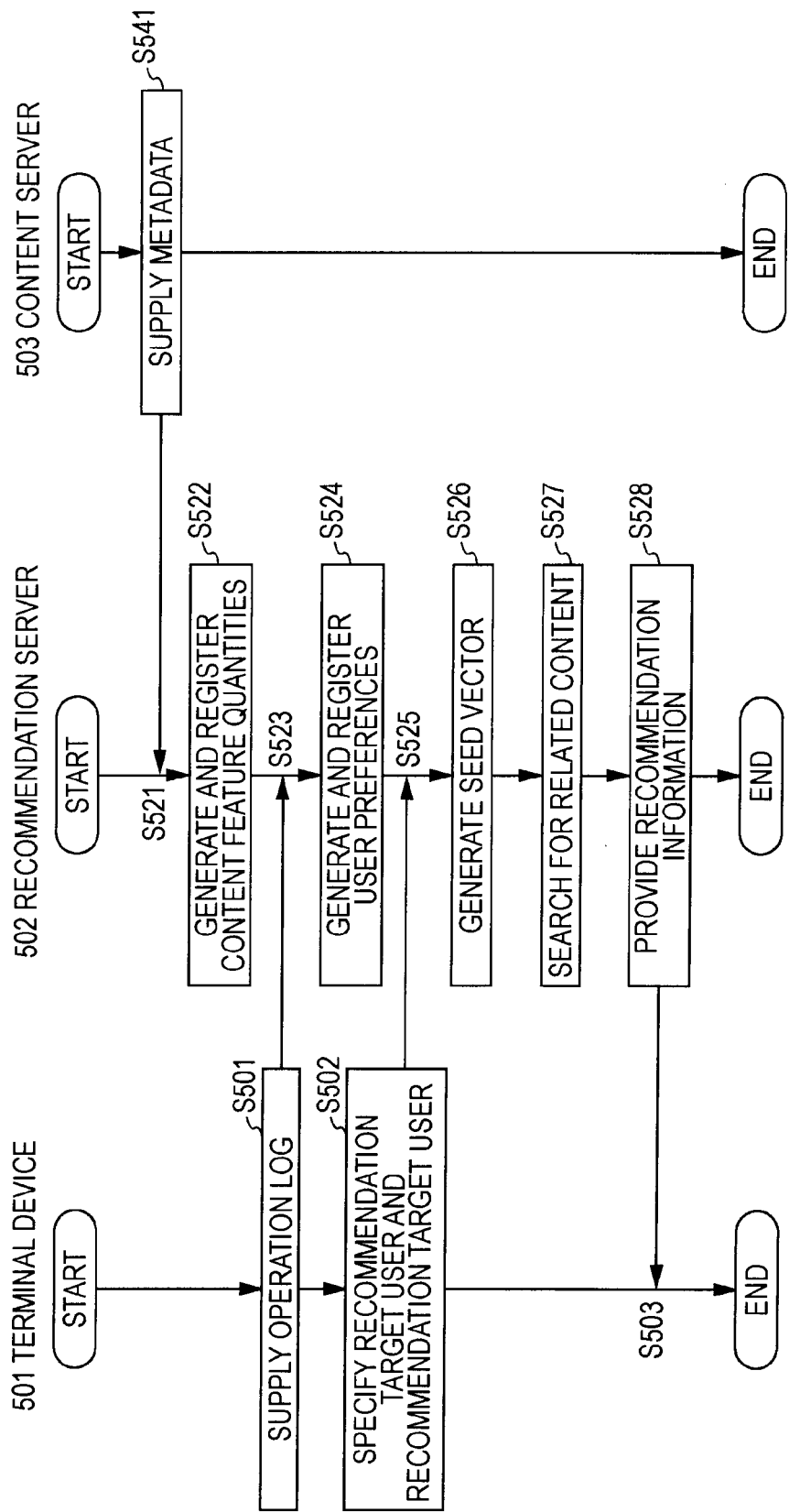
FIG. 22 is a flowchart illustrating an example of the flow of a recommendation system process.

An example of the flow of a recommendation system process performed in the recommendation system 500 of such a configuration will be described with reference to the flowchart of FIG. 22.

In step S541, the content server 503 supplies the metadata of the content managed by the content server 503 itself to the recommendation server 502. When the recommendation server 502 obtains the metadata in step S521, in step S522, the recommendation server 502 generates content feature quantities from the metadata, and registers the content feature quantities in the content feature quantity database.

In step S501, the terminal device 501 supplies the operation log of the user of the terminal device 501 to the recommendation server 502. When the recommendation server 502 obtains the operation log in step S523, in step S524, the recommendation server 502 generates user preferences by using the operation log, and registers the user preferences in the user preference database.

When the user operates an item in the terminal device 501, the terminal device 501 specifies the user as a recommendation target user, further specifies the item that is operated by the user as a recommendation target item, and supplies these specification information to the recommendation server 502. In step S525, the recommendation server 502 obtains the specification information.

In step S526, the recommendation server 502 generates a seed vector. In step S527, the recommendation server 502 searches for related content on the basis of the seed vector. In step S528, the recommendation server 502 provides, to the terminal device 501, the recommendation information that specifies the retrieved related content.

In step S503, the terminal device 501 obtains the recommendation information and presents related content to the user.

As described above, also, in the case of the recommendation system 500 including a plurality of devices, similarly to the cases of the above-mentioned recommendation device 100 and recommendation device 300, it is possible to more easily recommend content that is more suitable for the user.

System Configuration

In the recommendation system 500, a part of the internal configuration (the configuration of the recommendation device 100 and the recommendation device 300) of the recommendation server 502 may be included in another device, such as the terminal device 501 or the content server 503.

Figure 23:
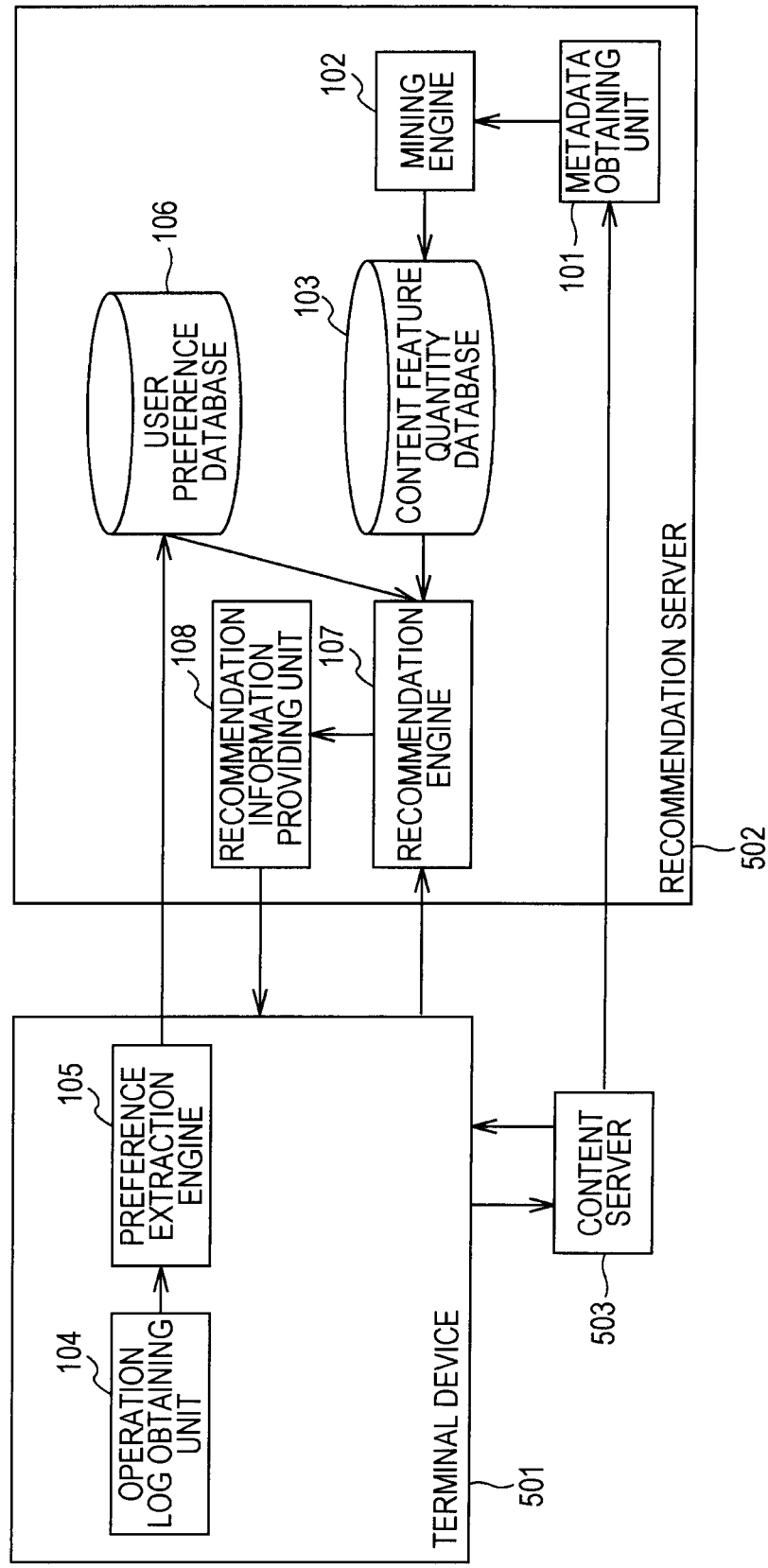
FIG. 23 is a block diagram showing another example of the configuration of the recommendation system to which the present invention is applied.

For example, as shown in FIG. 23, the operation log obtaining unit 104 and the preference extraction engine 105 may be included in the terminal device 501.

Figure 24:
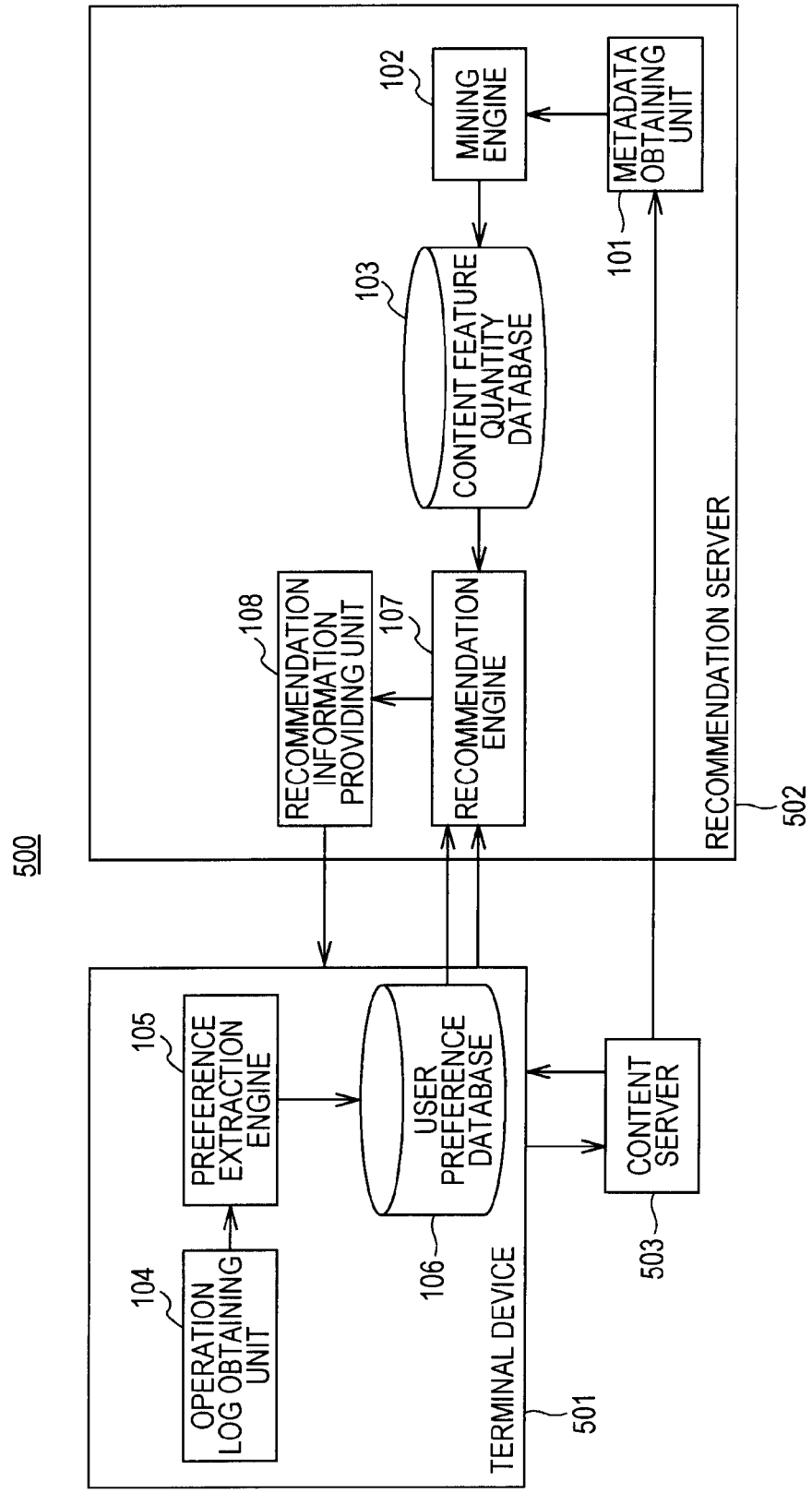
FIG. 24 is a block diagram showing another example of the configuration of the recommendation system to which the present invention is applied.

Furthermore, for example, as shown in FIG. 24, the user preference database 103 may also be included in the terminal device 501.

Figure 25:
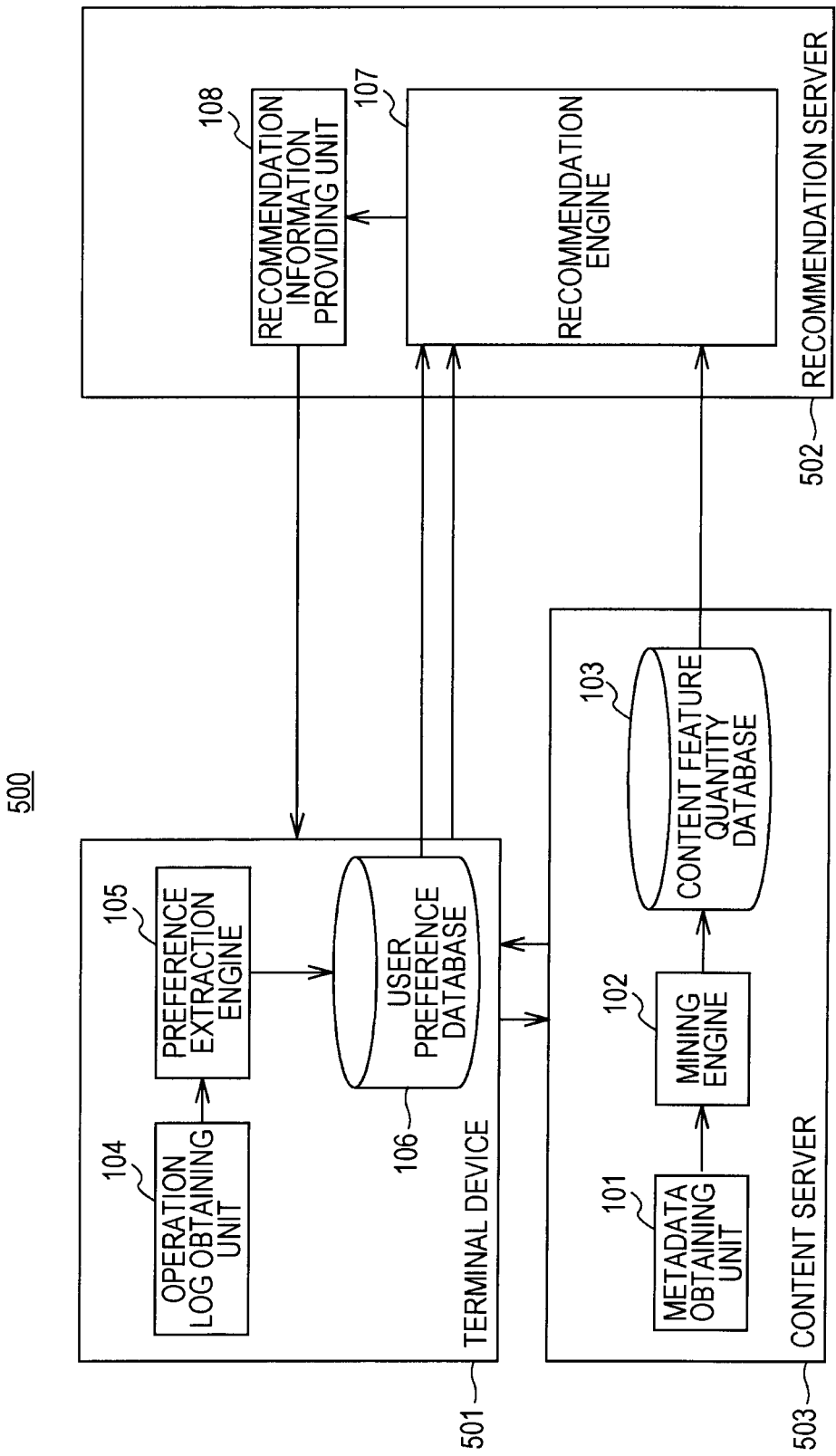
FIG. 25 is a block diagram showing another example of the configuration of the recommendation system to which the present invention is applied.

Furthermore, for example, as shown in FIG. 25, the metadata obtaining unit 101, the mining engine 102, and the content feature quantity database 103 may be included in the content server 503.

At this time, as in the case of FIG. 23, the user preference database 106 may be included in the recommendation server 502, and the operation log obtaining unit 104 and the preference extraction engine 105 may also be included in the recommendation server 502.

Furthermore, the metadata obtaining unit 101 and the mining engine 102 may be included in the content server 503, and the content feature quantity database 103 may be included in the recommendation server 502.

Of course, these devices may be of a configuration other than the above.

6. Sixth Embodiment

System Configuration

Figure 26:
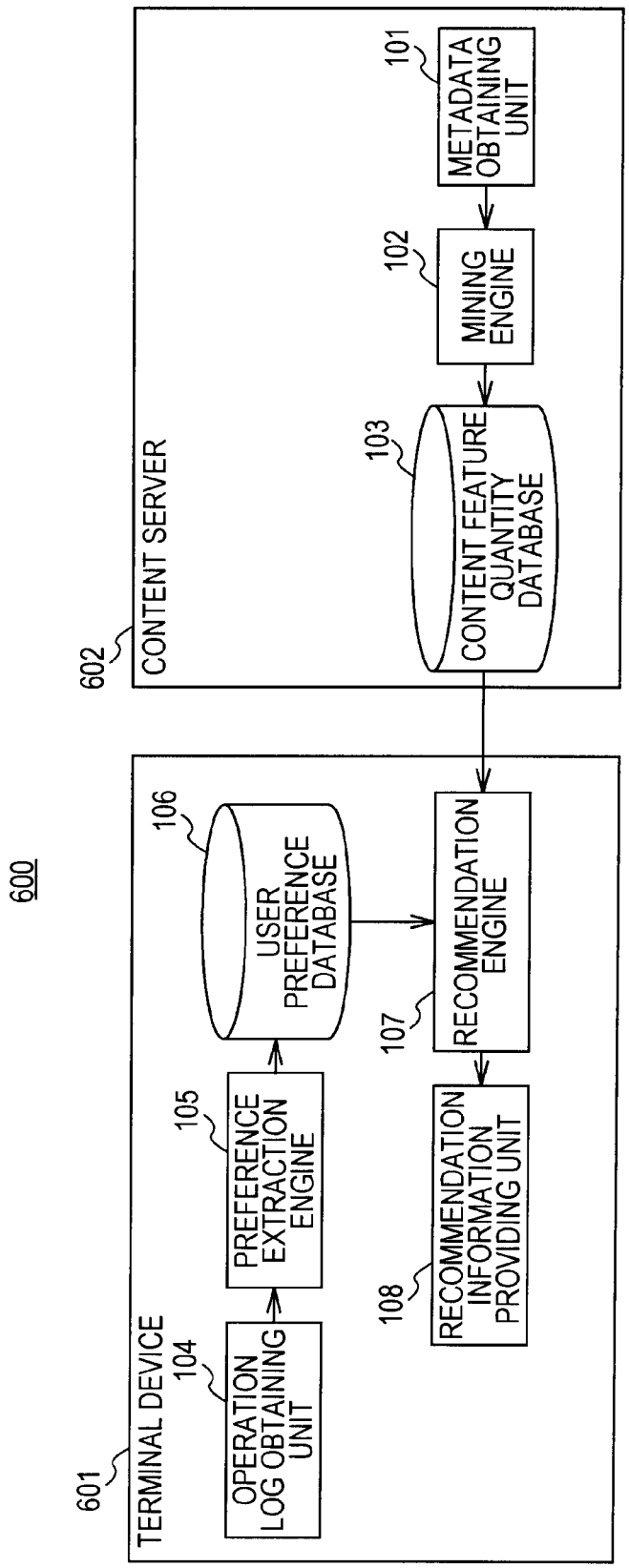
FIG. 26 is a block diagram showing an example of the configuration of a content distribution system to which the present invention is applied.

For example, as shown in FIG. 26, all the components of the recommendation server 502 may be allocated to either the terminal device or the content server. FIG. 26 is a block diagram showing an example of the configuration of a content distribution system to which the present invention is applied.

A content distribution system 600 shown in FIG. 26 is a system that distributes content from a content server 602 to a terminal device 601 on the basis of the request from the terminal device 601.

The content distribution system 600 is such that the functions (the configuration) of the recommendation server 502 in the recommendation system 500 shown in FIG. 21 are assigned to the terminal device and the content server, and similar processing is performed as the whole system. That is, in the terminal device 601, the recommendation of the related content of the content on which processing, such as reproduction, selection, or the like, has been instructed by the user, is performed.

As shown in FIG. 26, the terminal device 601 includes, in addition to the configuration of the terminal device 501, the operation log obtaining unit 104, the preference extraction engine 105, the user preference database 106, the recommendation engine 107, and the recommendation information providing unit 108. The operation log obtaining unit 104 through to the recommendation information providing unit 108 are functions of the recommendation server 502.

Furthermore, the content server 602 includes, in addition to the configuration of the content server 503, the metadata obtaining unit 101, the mining engine 102, and the content feature quantity database 103. The metadata obtaining unit 101 through to the content feature quantity database 103 are functions of the recommendation server 502.

That is, the content server 602 registers the content feature quantities of the content that is managed by the content server 602 itself in the content feature quantity database 103. The terminal device 601 extracts user preferences from the operation log of the user of the terminal device 601, and registers the user preferences in the user preference database 106. Furthermore, by using the user preferences registered in the user preference database 106 and the content feature quantity database 103 of the content server 602, the terminal device 601 searches for related content of the recommendation target content specified by the user of the terminal device 601, and recommends the related content to the user.

As a result of the above, it is possible for the terminal device 601 to more easily recommend content that is more suitable for the user.

The method of allocating the components of the recommendation server 502 is arbitrary, and may be other than that described above. For example, some or all of the components including the operation log obtaining unit 104 through to the recommendation information providing unit 108 may be provided in the content server 602, and some or all of the components including the metadata obtaining unit 101 through to the content feature quantity database 103 may be provided in the terminal device 601.

7. Seventh Embodiment

System Configuration

Furthermore, the recommendation server 502 may be configured as another plurality of devices differing from the terminal device and the content server.

FIG. 27 is a block diagram showing another example of the configuration of a recommendation system to which the present invention is applied.

A recommendation system 700 shown in FIG. 27 is a system similar to the recommendation system 500 shown in FIG. 21. A terminal device 701 possessed by the recommendation system 700 corresponds to the terminal device 501, has substantially the same configuration as that of the terminal device 501, and performs the same processing as that of the terminal device 501. Furthermore, a content server 702 possessed by the recommendation system 700 corresponds to the content server 503, has the same configuration as that of the content server 503, and performs the same processing as that of the content server 503.

The recommendation system 700 includes, in place of the recommendation server 502 possessed by the recommendation system 500, a content feature quantity extraction device 703, a preference extraction device 705, a recommendation information providing server 707, the content feature quantity database 103, and the user preference database 106.

The content feature quantity extraction device 703 includes the metadata obtaining unit 101 and the mining engine 102, and registers content feature quantities in the content feature quantity database 103 on the basis of the metadata supplied from the content server 702.

The preference extraction device 705 includes the operation log obtaining unit 104 and the preference extraction engine 105, generates user preferences from the operation log obtained from the terminal device 701, and registers the user preferences in the user preference database 106.

The recommendation information providing server 707 includes the recommendation engine 107 and the recommendation information providing unit 108, searches for related content of the recommendation target content specified by (the user (the recommendation target user) of) the terminal device 701 by using the user preferences of the recommendation target user, which are obtained from the user preference database 106, and the content feature quantities obtained from the content feature quantity database 103, and recommends the related content to (the user of) the terminal device 701.

That is, the content feature quantity extraction device 703, the preference extraction device 705, the recommendation information providing server 707, the content feature quantity database 103, and the user preference database 106 are such that the configuration of the recommendation server 502 is divided into a plurality of devices, and perform the same processing as that of the recommendation server 502 as a whole.

Therefore, it is possible for the recommendation system 700 to more easily recommend content that is more suitable for the user in the same manner as in the case of the recommendation system 500.

The method of dividing the configuration of the recommendation server 502 is arbitrary, and may be divided at a pattern other than the pattern shown in FIG. 27. For example, the content feature quantity database 103 and the user preference database 106 may be collected as one device, and each of them may be provided in one of the content feature quantity extraction device 703, the preference extraction device 705, and the recommendation information providing server 707.

Furthermore, the metadata obtaining unit 101 and the mining engine 102 may be configured as mutually different devices, and each of them may be provided in either the preference extraction device 705 or the recommendation information providing server 707.

Similarly, the operation log obtaining unit 104 and the preference extraction engine 105 may be configured as mutually different devices, and each of them may be provided in either the content feature quantity extraction device 703 or the recommendation information providing server 707.

Similarly, the recommendation engine 107 and the recommendation information providing unit 108 may be configured as mutually different devices, and each of them may be provided in either the content feature quantity extraction device 703 or the preference extraction device 705.

Of course, a pattern other than the above may be used.

8. Eighth Embodiment

Personal Computer

The above-described series of processes can be executed by hardware or software. In this case, for example, a personal computer shown in FIG. 28 may be configured.

In FIG. 28, a central processing unit (CPU) 801 of a personal computer 800 performs various processes in accordance with a program stored in a read only memory (ROM) 802 or a program loaded from a storage unit 813 into a random access memory (RAM) 803. In the RAM 803, data that is necessary for the CPU 801 to perform various processes, and the like are also stored as appropriate.

The CPU 801, the ROM 802, and the RAM 803 are interconnected with one another via a bus 804. Furthermore, an input/output interface 810 is also connected to this bus 804.

An input unit 811, an output unit 812, a storage unit 813, and a communication unit 814 are connected to the input/output interface 810. The input unit 811 includes a keyboard, a mouse, and the like. The output unit 812 includes a display unit formed of a cathode ray tube (CRT) display or a liquid crystal display (LCD) display, a speaker, and the like. The storage unit 813 includes a hard disk, and the like. The communication unit 814 includes a modem, and the like. The communication unit 814 performs a communication process via a network including the Internet.

Furthermore, a drive 815 is connected to the input/output interface 810 as necessary. A removable medium 821, such as a magnetic disk, an optical disc, a magneto-optical disc, or a semiconductor memory, is loaded thereinto as appropriate, and a computer program read therefrom is installed in the storage unit 813 as necessary.

In the case where the above-described series of processes is to be performed by software, a program forming the software is installed from a network or a recording medium.

For example, as shown in FIG. 28, this recording medium is formed of a removable medium 821 composed of a magnetic disk (including a flexible disk), an optical disc (including a compact disc-read only memory (CD-ROM)), a digital versatile disc (DVD), a magneto-optical disc (including a mini-disk (MD)), or a semiconductor memory, in which a program is recorded, the recording medium being distributed to provide the program to the user separately from the main unit of the apparatus. In addition, the recording medium is formed of the ROM 802 and a hard disk in which a program is recorded, which are provided to the user by being incorporated in advance into the main unit of the apparatus.

The program executed by the computer may be a program that is processed in a time-series manner in accordance with the order described in this specification, and may be a program that is processed in parallel or at a necessary timing, such as when being called.

In this specification, steps describing a program recorded on a recording medium include processes that are performed in a time-series manner according to the written order, and also includes processes that are performed in parallel or individually although they may not be performed in a time-series manner.

In this specification, the system designates the entire apparatus formed of a plurality of devices.

In the foregoing, the configuration described as one device (or a processing unit) may be divided so as to be configured as a plurality of devices (or processing units). Conversely, in the foregoing, the configuration described as a plurality of devices (or processing units) may be configured collectively as one device (or processing unit). Furthermore, a configuration other than the configuration described above may of course be added to the configuration of each device (or each processing unit). In addition, as long as the configuration and the operation as the overall system are substantially the same, a part of the configuration of a certain device (or a processing unit) may be included in the configuration of another device (or another processing unit). That is, the embodiments of the present invention are not limited to the above-described embodiments, and various changes are possible within the spirit and scope of the present invention.

The present application contains subject matter related to that disclosed in Japanese Priority Patent Application JP 2009-290902 filed in the Japan Patent Office on Dec. 22, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a correction device comprising at least one processor for correcting item feature quantities representing, as an item, calculated content features of a recommendation target item for which a recommendation process for recommending an item having features resembling those of the recommendation target item is performed by using user preferences representing preferences of a recommendation target user who is a party to whom the item is recommended with respect to the item, wherein the user preferences are determined based on a list of content or metadata previously selected or viewed by the recommendation target user, and wherein correcting comprises modifying calculated content feature quantities based on the determined user preferences;
a preference storage device for storing predetermined preferences common to all users, wherein the correction device, when user preferences representing a particular recommendation target user are unavailable, obtains the predetermined preferences from the preference storage device, and corrects the item feature quantities of the recommendation target item by using the obtained predetermined preferences;
a matching device comprising at least one processor for comparing the item feature quantities corrected by the correction with the item feature quantities of another item and for searching for another item having item feature quantities that resemble those of the recommendation target item, wherein the matching device includes a degree of similarity calculation device for calculating a degree of similarity between the item feature quantities of the recommendation target item and the item feature quantities of another item, and a degree of similarity holding device for holding the degree of similarity calculated by the degree of similarity calculation device; and
a recommendation device for recommending related items having features resembling those of the recommendation target item on the basis of the result of the matching by the matching device.

2. The information processing apparatus according to claim 1, wherein the correction device further includes
a comparison device for comparing each of attribute values contained in the item feature quantities with each of attribute values contained in the user preferences of the recommendation target user, and
an amplification device for amplifying a degree of importance of an attribute value contained in both the item feature quantities and the user preferences on the basis of the result of the comparison by the comparison device.

3. The information processing apparatus according to claim 2, further comprising an attenuation device for attenuating a degree of importance of an attribute value that is contained in the item feature quantities and that is not contained in the user preferences on the basis of the result of the comparison by the comparison device.

4. The information processing apparatus according to claim 1, wherein the degree of similarity calculation device calculates, as the degree of similarity, a sum total of multiplication results in which a predetermined weight coefficient for each attribute is multiplied by an absolute value of an inner product between attribute vectors in which the item feature quantities are vectorized for each attribute.

5. The information processing apparatus according to claim 1, wherein the matching device further includes a related item selection device for selecting, as related items of the recommendation target item, a predetermined number of the items in ascending order of the value of the degree of similarity held by the degree of similarity holding device.

6. The information processing apparatus according to claim 1, further comprising an item feature quantity storage device for storing the item feature quantities, wherein the correction device
  obtains the item feature quantities of the recommendation target item from the item feature quantity storage device, and
  corrects the obtained item feature quantities by using the user preferences, and
wherein the matching device
  obtains the item feature quantities of the other item from the item feature quantity storage device, and
  performs matching between the obtained item feature quantities and the item feature quantities corrected by the correction device.

7. The information processing apparatus according to claim 6, further comprising:
  a metadata obtaining device for obtaining metadata containing information regarding the item;
  an item feature quantity extraction device for extracting the item feature quantities from the metadata obtained by the metadata obtaining device; and
  an item feature quantity registration device for registering the item feature quantities extracted by the item feature quantity extraction device in the item feature quantity storage device.

8. The information processing apparatus according to claim 1, further comprising user preference storage device for storing the user preferences, wherein the correction device
  obtains the user preferences of the recommendation target user from the user preference storage device, and
  corrects the item feature quantities of the recommendation target item by using the obtained user preferences.

9. The information processing apparatus according to claim 8, further comprising:
  an operation log obtaining device for obtaining an operation log of a user;
  a user preference extraction device for extracting the user preferences from the operation log obtained by the operation log obtaining device; and
  a user preference registration device for registering the user preferences extracted by the user preference extraction device in the user preference storage device.

10. The information processing apparatus according to claim 1, further comprising
  a user preference storage device for storing the user preferences, and a degree of maturity indicating the amount of information of the user preferences or a number of times of updating, wherein the correction device includes
    a user preference obtaining device for obtaining the user preferences of the recommendation target user from the user preference storage device,
    a degree of maturity obtaining device for obtaining a degree of maturity of user preferences from the user preference storage device,
    a preference obtaining device for obtaining the predetermined preferences from the preference storage device,
    a mixing device for mixing the predetermined preferences obtained by the preference obtaining device and the user preferences obtained by the user preference obtaining device at a ratio corresponding to the degree of maturity obtained by the degree of maturity obtaining device,
    a comparison device for comparing each of the attribute values contained in the item feature quantities with each of the attribute values contained in the mixed result of the predetermined preferences and the user preferences by the mixing device, and amplification device for amplifying a degree of importance of an attribute value contained in both the item feature quantities and the mixed result on the basis of the result of the comparison by the comparison device.

11. An image processing method for use with an information processing apparatus, comprising the steps of:
  correcting, using a correction device of the information processing apparatus, item feature quantities representing, as an item, calculated content features of a recommendation target item for which a recommendation process for recommending an item having features resembling those of the recommendation target item is performed by using user preferences representing preferences of a recommendation target user who is a party to whom the item is recommended with respect to the item, wherein the user preferences are determined based on a list of content or metadata selected or viewed by the recommendation target user, and wherein correcting comprises modifying calculated content feature quantities based on the determined user preferences;
  storing, in a preference storage device, predetermined preferences common to all users;
  obtaining, when user preferences representing a particular recommendation target user are unavailable, the predetermined preferences from the preference storage device and correcting the item feature quantities of the recommendation target item by using the obtained predetermined preferences;
  causing, using a matching device of the information processing apparatus, the corrected item feature quantities to be matched with item feature quantities of another item, and searching for another item having the item feature quantities that resemble those of the recommendation target item, wherein said causing comprises calculating a degree of similarity between the item feature quantities of the recommendation target item and the item feature quantities of another item, and holding the degree of similarity calculated by the degree of similarity calculation device; and
  recommending, using a recommendation device of the information processing apparatus, related items having features resembling those of the recommendation target item on the basis of the result of the matching.

12. A non-transitory computer-readable storage medium having computer-executable instructions that, when executed, cause a computer to carry out a procedure comprising the steps of:
  correcting item feature quantities representing, as an item, calculated content features of a recommendation target item for which a recommendation process for recommending an item having features resembling those of the recommendation target item is performed by using user preferences representing preferences of a recommendation target user who is a party to whom the item is recommended with respect to the item, wherein the user preferences are determined based on a list of content or metadata previously selected or viewed by the recommendation target user and wherein correcting comprises modifying calculated content feature quantities based on the determined user preferences;

storing, in a preference storage device, predetermined preferences common to all users;

obtaining, when user preferences representing a particular recommendation target user are unavailable, the predetermined preferences from the preference storage device and correcting the item feature quantities of the recommendation target item by using the obtained predetermined preferences;

comparing the item feature quantities with the item feature quantities of another item and searching for another item having item feature quantities that resemble those of the recommendation target item, wherein said comparing comprises calculating a degree of similarity between the item feature quantities of the recommendation target item and the item feature quantities of another item, and holding the degree of similarity calculated by the degree of similarity calculation device; and recommending related items having features resembling those of the recommendation target item on the basis of the result of the comparing and searching.

* * * * *